US012476773B2

(12) United States Patent
Ibrahim et al.

(10) Patent No.: US 12,476,773 B2
(45) Date of Patent: Nov. 18, 2025

(54) RESOURCE RESTRICTIONS FOR SUB-BAND FULL-DUPLEX (SBFD) AND DYNAMIC TIME DIVISION DUPLEX (TDD) OPERATION

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 463 days.

(21) Appl. No.: 17/957,701

(22) Filed: Sep. 30, 2022

(65) Prior Publication Data

US 2024/0113850 A1 Apr. 4, 2024

(51) Int. Cl.
H04L 5/14 (2006.01)
H04W 72/0446 (2023.01)
H04W 72/20 (2023.01)

(52) U.S. Cl.
CPC ....... *H04L 5/1469* (2013.01); *H04W 72/0446* (2013.01); *H04W 72/20* (2023.01)

(58) Field of Classification Search
None
See application file for complete search history.

(56) References Cited

U.S. PATENT DOCUMENTS

2021/0337582 A1\* 10/2021 Kuang ................ H04W 72/23
2025/0038923 A1\* 1/2025 Ma ........................ H04L 5/0007

OTHER PUBLICATIONS

International Search Report and Written Opinion—PCT/US2023/071517—ISA/EPO—Nov. 8, 2023 (2207897WO).
Qualcomm Incorporated: "Feasibility and Techniques for Subband Non-Overlapping Full Duplex", 3GPP TSG RAN WG1, Meeting #110, 3GPP Draft, R1-2207231, vol. Ran WG1, No. Toulouse, Aug. 22, 2022-Aug. 26, 2022, Aug. 13, 2022, XP052275167, pp. 1-28, Sections 1-5.

(Continued)

*Primary Examiner* — Hong S Cho
(74) *Attorney, Agent, or Firm* — Holland & Hart LLP

(57) ABSTRACT

Methods, systems, and devices for wireless communications are described. Some wireless communications systems may support resource restrictions for sub-band full duplex (SBFD) and dynamic time division duplex (TDD) operations. For example, a user equipment (UE) may receive, from a network entity, control signaling indicating a restriction to one or more slots associated with communications between the UE and the network entity. Each of the one or more slots may be associated with one or more sub-bands and the restriction may modify an availability of a duplexing setting for at least a portion of the one or more sub-bands. Additionally, the UE may communicate with the network entity via at least a subset of the one or more sub-bands of the one or more slots in accordance with the restriction.

30 Claims, 16 Drawing Sheets

(56) References Cited

OTHER PUBLICATIONS

Qualcomm Incorporated: "On Potential Enhancements on Dynamic/Flexible TDD", 3GPP TSG RAN WG1, Meeting #110, 3GPP Draft, R1-2207232, vol. RAN WG1, No. Toulouse, Aug. 22, 2022-Aug. 26, 2022, Aug. 13, 2022, XP052275168, pp. 1-21, Sections 1-7.

Samsung: "SBFD Feasibility and Design Considerations for NR Duplex Evolution", 3GPP TSG-RAN WG1 Meeting #110, 3GPP Draft, R1-2206421, vol. RAN WG1, No. Toulouse, France, Aug. 22, 2022-Aug. 26, 2022, Aug. 12, 2022, XP052274353, pp. 1-23, Sections 1-6.

* cited by examiner

RESOURCE RESTRICTIONS FOR SUB-BAND FULL-DUPLEX (SBFD) AND DYNAMIC TIME DIVISION DUPLEX (TDD) OPERATION

FIELD OF TECHNOLOGY

The following relates to wireless communications, including resource restrictions for sub-band full-duplex (SBFD) and dynamic time division duplex (TDD) operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support resource restrictions for sub-band full-duplex (SBFD) and dynamic time division duplex (TDD) operation. Generally, the described techniques provide for configuring a wireless device, such as a first user equipment (UE), with one or more restrictions to an availability or duplexing setting for one or more sub-bands during one or more slots, which can mitigate cross-link interference (CLI) between the first UE and other devices communicating during the one or more slots is mitigated.

A method for wireless communications at a UE is described. The method may include receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands and communicating with the network entity via at least a subset of the one or more slots in accordance with the restriction.

An apparatus for wireless communications at a UE is described. The apparatus may include a processor, memory coupled with the processor, and instructions stored in the memory. The instructions may be executable by the processor to cause the apparatus to receive control signaling indicating a restriction to one or more slots associated with communications between the UE and a network entity, where each of the one or more slots is associated with one or more sub-bands and the restriction modifies an availability or a duplexing setting for at least a portion of the one or more sub-bands and communicate with the network entity via at least a subset of the one or more sub-bands of the one or more slots in accordance with the restriction.

Another apparatus for wireless communications at a UE is described. The apparatus may include means for receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands and means for communicating with the network entity via at least a subset of the one or more sub-bands of the one or more slots in accordance with the restriction.

A non-transitory computer-readable medium storing code for wireless communications at a UE is described. The code may include instructions executable by a processor to receive control signaling indicating a restriction to one or more slots associated with communications between the UE and a network entity, where each of the one or more slots is associated with one or more sub-bands and the restriction modifies an availability or a duplexing setting for at least a portion of the one or more sub-bands and communicate with the network entity via at least a subset of the one or more sub-bands of the one or more slots in accordance with the restriction.

In some examples of the method, apparatuses, and non-transitory computer-readable medium described herein, receiving the control signaling may include operations, features, means, or instructions for receiving an indication that the restriction applies to a first slot of the one or more slots, where modifying the duplexing setting includes restricting the UE from communicating via one or more uplink sub-bands during the first slot or restricting the UE from communicating via one or more downlink sub-bands during the first slot.

In some examples of the method, apparatuses, and non-transitory computer-readable medium described herein, communicating with the network entity via the at least subset of the one or more sub-bands of the one or more slots in accordance with the restriction may include operations, features, means, or instructions for canceling a reception of downlink signaling via the one or more downlink sub-bands based on an overlap between a first set of resources associated with the downlink signaling and a second set of resources associated with the one or more downlink sub-bands.

In some examples of the method, apparatuses, and non-transitory computer-readable medium described herein, the downlink signaling may be associated with periodic signaling or semi-periodic signaling.

In some examples of the method, apparatuses, and non-transitory computer-readable medium described herein, communicating with the network entity via the at least subset of the one or more sub-bands of the one or more slots in accordance with the restriction may include operations, features, means, or instructions for canceling a transmission of uplink signaling via the one or more uplink sub-bands based on an overlap between a first set of resources associated with the uplink signaling and a second set of resources associated with the one or more uplink sub-bands.

In some examples of the method, apparatuses, and non-transitory computer-readable medium described herein, the uplink signaling may be associated with periodic signaling or semi-periodic signaling.

In some examples of the method, apparatuses, and non-transitory computer-readable medium described herein, communicating with the network entity via the at least subset of the one or more sub-bands of the one or more slots in accordance with the restriction may include operations, features, means, or instructions for receiving downlink signaling via the one or more downlink sub-bands in accordance with one or more rules associated with the restriction, where the downlink signaling may be associated with a first set of resources that partially overlaps with a second set of resources associated with the one or more downlink sub-bands.

In some examples of the method, apparatuses, and non-transitory computer-readable medium described herein, the one or more rules includes a first rule permitting the UE to receive periodic downlink signals, semi-periodic downlink signals, or both, via the one or more restricted downlink sub-bands, a second rule permitting the UE to receive signaling associated with a defined set of signal types via the one or more restricted downlink sub-bands, or a combination thereof.

In some examples of the method, apparatuses, and non-transitory computer-readable medium described herein, communicating with the network entity via the at least subset of the one or more sub-bands of the one or more slots in accordance with the restriction may include operations, features, means, or instructions for transmitting uplink signaling via the one or more uplink sub-bands in accordance with one or more rules associated with the restriction, and where the uplink signaling may be associated with a first set of resources that partially overlaps with a second set of resources associated with the one or more uplink sub-bands.

In some examples of the method, apparatuses, and non-transitory computer-readable medium described herein, the one or more rules includes a first rule permitting the UE to transmit periodic uplink signals, semi-periodic uplink signals, or both, via the one or more uplink restricted sub-bands, a fourth rule permitting the UE to transmit signaling associated with a defined set of signal types via the one or more uplink restricted sub-bands, or a combination thereof.

In some examples of the method, apparatuses, and non-transitory computer-readable medium described herein, receiving the control signaling indicating the restriction may include operations, features, means, or instructions for receiving an indication of respective sub-band configurations associated with each of the one or more slots, where modifying the availability of the at least portion of the one or more sub-bands may be based on the respective sub-band configurations.

In some examples of the method, apparatuses, and non-transitory computer-readable medium described herein, communicating with the network entity may include operations, features, means, or instructions for transmitting, to the network entity, or receiving, from the network entity, one or more transmissions based on the one or more transmissions being associated with a set of frequency resources within the subset of available frequency resources.

In some examples of the method, apparatuses, and non-transitory computer-readable medium described herein, communicating with the network entity may include operations, features, means, or instructions for cancelling a transmission or reception of one or more transmissions associated with a set of frequency resources that falls at least partially outside of the subset of available frequency resources.

Some examples of the method, apparatuses, and non-transitory computer-readable medium described herein may further include operations, features, means, or instructions for receiving a second control signaling indicating a set of multiple slot restriction configurations to the one or more slots associated with communications between the UE and the network entity, where the control signaling indicating the restriction to the one or more slots includes an indication of a first slot restriction configuration of the set of multiple slot restriction configurations.

In some examples of the method, apparatuses, and non-transitory computer-readable medium described herein, receiving the control signaling indicating the restriction may include operations, features, means, or instructions for receiving a broadcast communication indicating one or more restricted time resources, one or more restricted frequency resources, or both, associated with the one or more slots, where communicating with the network entity may be based on the one or more restricted time resources, the one or more restricted frequency resources, or both.

In some examples of the method, apparatuses, and non-transitory computer-readable medium described herein, receiving the control signaling indicating the restriction may include operations, features, means, or instructions for receiving a bitmap via the field indicating the restriction, where each bit in the bitmap may be associated with a respective slot of the one or more slots, and where each bit in the bitmap indicates an uplink restriction to the respective slot of the one or more slots or a downlink restriction to the respective slot of the one or more slots.

In some examples of the method, apparatuses, and non-transitory computer-readable medium described herein, receiving the control signaling indicating the restriction may include operations, features, means, or instructions for receiving an indication of one or more sub-fields of the field indicating the restriction, where each sub-field may be associated with a respective slot of the one or more slots, and where each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

In some examples of the method, apparatuses, and non-transitory computer-readable medium described herein, communicating with the network entity via the at least subset of the one or more sub-bands of the one or more slots in accordance with the restriction may include operations, features, means, or instructions for transmitting uplink signaling via at least a subset of the one or more slots according to the one or more parameters associated with the transmit power, the one or more parameters associated with the transmit beam, or both.

In some examples of the method, apparatuses, and non-transitory computer-readable medium described herein, the control signaling includes respective restrictions associated with a set of multiple UEs and the UE determines the restriction to the one or more slots associated with communications between the UE and the network entity based on a position of the indication of the restriction within the control signaling.

In some examples of the method, apparatuses, and non-transitory computer-readable medium described herein, receiving the control signaling indicating the restriction may include operations, features, means, or instructions for receiving an indication of a pattern of one or more uplink resource restrictions to the one or more slots, one or more downlink resource restriction to the one or more slots, or both, where the restriction may be based on the pattern, and where the control signaling includes a field indicating the pattern.

Some examples of the method, apparatuses, and non-transitory computer-readable medium described herein may further include operations, features, means, or instructions for modifying the availability or the duplexing setting for the at least portion of the one or more sub-bands may be based on a time threshold, the time threshold may be associated with a first quantity of slots that may be greater than or equal to a second quantity of slots associated with a monitoring periodicity for the control signaling or the time threshold may be associated with a third quantity of slots following a first slot of the one or more slots including feedback information associated with the control signaling, and the third quantity of slots may be based on a fourth quantity of slots in a subframe associated with communications between the UE and the network entity.

A method for wireless communications at a network entity is described. The method may include transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands and communicating with the UE via at least a subset of the one or more sub-bands of the one or more slots in accordance with the restriction.

An apparatus for wireless communications at a network entity is described. The apparatus may include a processor, memory coupled with the processor, and instructions stored in the memory. The instructions may be executable by the processor to cause the apparatus to transmit control signaling indicating a restriction to one or more slots associated with communications between the network entity and a UE, where each of the one or more slots is associated with one or more sub-bands and the restriction modifies an availability or a duplexing setting for at least a portion of the one or more sub-bands and communicate with the UE via at least a subset of the one or more sub-bands of the one or more slots in accordance with the restriction.

Another apparatus for wireless communications at a network entity is described. The apparatus may include means for transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands and means for communicating with the UE via at least a subset of the one or more sub-bands of the one or more slots in accordance with the restriction.

A non-transitory computer-readable medium storing code for wireless communications at a network entity is described. The code may include instructions executable by a processor to transmit control signaling indicating a restriction to one or more slots associated with communications between the network entity and a UE, where each of the one or more slots is associated with one or more sub-bands and the restriction modifies an availability or a duplexing setting for at least a portion of the one or more sub-bands and communicate with the UE via at least a subset of the one or more sub-bands of the one or more slots in accordance with the restriction.

Some examples of the method, apparatuses, and non-transitory computer-readable medium described herein may further include operations, features, means, or instructions for receiving coordination information indicating the one or more slots associated with communications of the UE, where the restriction to the one or more slots associated with communications of the UE may be based on the coordination information.

In some examples of the method, apparatuses, and non-transitory computer-readable medium described herein, transmitting the control signaling may include operations, features, means, or instructions for transmitting an indication that the restriction applies to a first slot of the one or more slots, where modifying the duplexing setting includes restricting the UE from communicating via one or more uplink sub-bands during the slot or restricting the UE from communicating via one or more downlink sub-bands during the slot.

In some examples of the method, apparatuses, and non-transitory computer-readable medium described herein, transmitting the control signaling indicating the restriction may include operations, features, means, or instructions for transmitting an indication of respective sub-band configurations associated with each of the one or more slots, where modifying the availability of the at least portion of the one or more sub-bands may be based on the respective sub-band configurations.

In some examples of the method, apparatuses, and non-transitory computer-readable medium described herein, communicating with the network entity may include operations, features, means, or instructions for transmitting or receiving one or more transmissions based on the one or more transmissions being associated with a set of frequency resources within the subset of available frequency resources.

Some examples of the method, apparatuses, and non-transitory computer-readable medium described herein may further include operations, features, means, or instructions for transmitting second control signaling indicating a set of multiple slot restriction configurations to the one or more slots associated with communications with the UE, where the control signaling indicating the restriction to the one or more slots includes an indication of a first slot restriction configuration of the set of multiple slot restriction configurations.

In some examples of the method, apparatuses, and non-transitory computer-readable medium described herein, transmitting the control signaling indicating the restriction may include operations, features, means, or instructions for transmitting a broadcast communication indicating one or more restricted time resources, one or more restricted frequency resources, or both, associated with the one or more slots, where communicating with the UE may be based on the one or more restricted time resources, the one or more restricted frequency resources, or both.

In some examples of the method, apparatuses, and non-transitory computer-readable medium described herein, transmitting the control signaling indicating the restriction may include operations, features, means, or instructions for transmitting an indication of one or more sub-fields of the field indicating the restriction, where each sub-field may be associated with a respective slot of the one or more slots, and where each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

In some examples of the method, apparatuses, and non-transitory computer-readable medium described herein, communicating with the UE via the at least subset of the one or more sub-bands of the one or more slots in accordance with the restriction may include operations, features, means, or instructions for receiving uplink signaling via at least a subset of the one or more slots according to the one or more parameters associated with the transmit power, the transmit beam, or both.

In some examples of the method, apparatuses, and non-transitory computer-readable medium described herein, the control signaling includes respective restrictions associated with a set of multiple UEs.

In some examples of the method, apparatuses, and non-transitory computer-readable medium described herein, transmitting the control signaling indicating the restriction may include operations, features, means, or instructions for transmitting an indication of a pattern of one or more uplink resource restrictions to the one or more slots, one or more downlink resource restriction to the one or more slots, or both, where the restriction may be based on the pattern, and where the control signaling includes a field indicating the pattern.

In some examples of the method, apparatuses, and non-transitory computer-readable medium described herein, the uplink signaling may be associated with periodic signaling or semi-periodic signaling.

DETAILED DESCRIPTION

Figure 1:
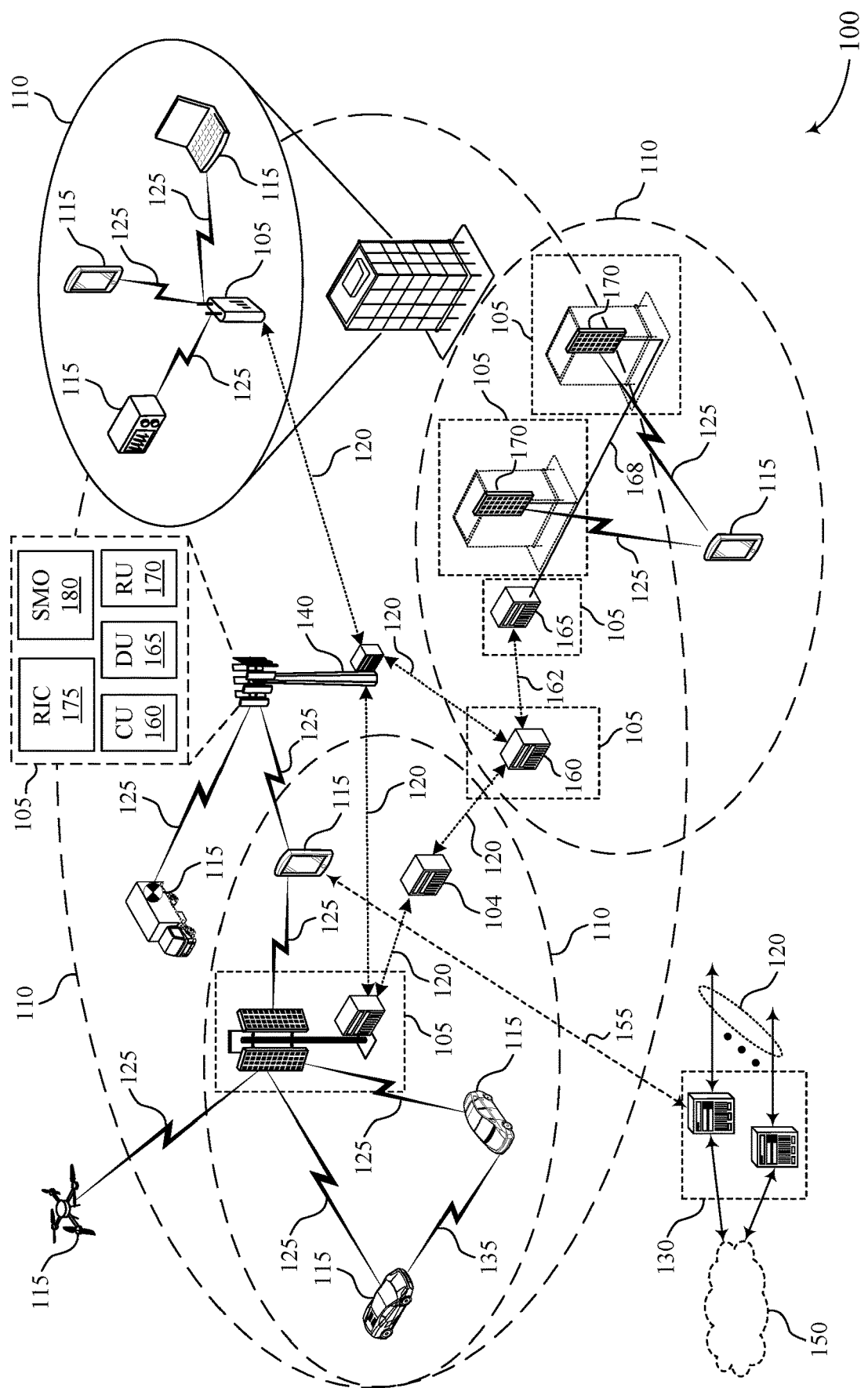
FIG. 1 illustrates an example of a wireless communications system that supports resource restrictions for sub-band full-duplex (SBFD) and dynamic time division duplex (TDD) operation in accordance with one or more aspects of the present disclosure.

In time division duplexing, individual slots can be designated for uplink or downlink traffic. In some cases, a first user equipment (UE) may transmit, to a first network entity, communications during a first slot and a second UE may receive, from a second network entity, communications during a second slot, where the first slot and the second slot overlap in the time domain. In some examples, the first slot may be an uplink slot and the second slot may be a downlink slot. Additionally, or alternatively, the first slot, the second slot, or both may be sub-band full-duplex (SBFD) slots, in which the first slot includes one or more uplink sub-bands and the downlink slot includes one or more downlink sub-bands, where the one or more uplink sub-bands are associated with frequency resources that do not overlap with frequency resources associated with the one or more downlink slots (e.g., which may be referred to as sub-band half duplex (SBHD) slots).

Cross link interference (CLI) may exist between the first UE and the second UE and/or between the first network entity and the second network entity due to the respective slot configurations of the first UE and the second UE. When dynamic TDD (D-TDD) is employed by one or both network entities, the designation of a slot as downlink, uplink, or special, may occur on the fly in response to real-time scenarios. Thus, without communication or coordination between the network entities, it may be difficult to predict and reduce the CLI between the first UE and the second UE, between the first network entity and the second network entity, or both. As such, techniques for coordinating slot formats of multiple UEs may be desired.

Accordingly, techniques described herein may support resource restriction in SBFD and dynamic TDD operations, such that CLI may be reduced. For example, a first network entity, communicating with a first UE, may transmit, to a second network entity communicating with a second UE, coordination information that may indicate one or more slots for resource restriction. The second network entity may receive the coordination information and transmit, to the second UE, control signaling indicating a restriction to the one or more slots, where each slot includes one or more sub-bands. The restriction may modify an availability or a duplex setting for at least a portion of the one or more sub-bands. For example, a first slot of the one or more slots may be a dynamic TDD uplink slot, in which the first slot includes an uplink sub-band associated with a set of frequency resources and the restriction may indicate a subset of the set of frequency resources of the uplink sub-band, such that the second UE may receive uplink signaling via the subset of frequency resources (e.g., modifying the availability of the uplink sub-band of the first slot). In another example, the first slot may be an SBFD slot including an uplink sub-band and a downlink sub-band, and the restriction may indicate the downlink sub-band such that the second UE may transmit downlink signaling via the downlink sub-band (e.g., modifying the duplex setting of the first slot). The second UE may communicate with the second network via at least a subset of the one or more sub-bands of the one or more slots in accordance with the restriction, reducing CLI between the first UE and the second UE.

Aspects of the disclosure are initially described in the context of wireless communications systems. Aspects of the disclosure are then described in the context of resource restriction scenarios and a process flow. Aspects of the disclosure are further illustrated by and described with reference to apparatus diagrams, system diagrams, and flowcharts that relate to resource restrictions for SBFD and dynamic TDD operation.

FIG. 1 illustrates an example of a wireless communications system 100 that supports resource restrictions for SBFD and dynamic TDD operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support resource restrictions for SBFD and dynamic TDD operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support resource restriction for SBFD and dynamic TDD operations. For example, a first network entity 105, communicating with a first UE 115, may transmit, to a second network entity 105 communicating with a second UE 115, coordination information that may indicate one or more slots for resource restriction. The second network entity 105 may receive the coordination information and transmit, to the second UE 115, control signaling indicating a restriction to the one or more slots, where each slot includes one or more sub-bands. The restriction may modify an availability or a duplex setting for at least a portion of the one or more sub-bands (e.g., during the one or more slots).

In some cases, a first slot of the one or more slots may be a dynamic TDD slot. For example, the first slot may be an uplink slot including an uplink sub-band associated with a set of frequency resources and the restriction may indicate a subset of the set of frequency resources of the uplink sub-band. In such cases, the restriction may indicate a subset of the set of frequency resources of the uplink sub-band, such that the second UE 115 may receive uplink signaling via the subset of frequency resources (e.g., modifying the availability of the uplink sub-band of the first slot). In some other examples, the first slot may be a downlink slot including a downlink sub-band associated with a set of frequency resources and the restriction may indicate a subset of the set of frequency resources of the downlink sub-band. In such cases, the restriction may indicate a subset of the set of frequency resources of the downlink sub-band, such that the second UE 115 may receive downlink signaling via the subset of frequency resources (e.g., modifying the availability of the downlink sub-band of the first slot).

Additionally, or alternatively, the first slot may be an SBFD slot including one or more uplink sub-bands and one or more downlink sub-bands. In some examples, the restriction may indicate at least one uplink sub-band of the one or more uplink sub-bands such that the second UE 115 may receive uplink signaling via the at least one uplink sub-band (e.g., modifying the duplex setting of the first slot). In some other examples, the restriction may indicate at least one downlink sub-band of the one or more downlink sub-bands such that the second UE 115 may transmit downlink signaling via the at least one downlink sub-band (e.g., modifying the duplex setting of the first slot).

The second UE 115 may communicate with the second network entity 105 via at least a subset of the one or more sub-bands of the one or more slots in accordance with the restriction, reducing CLI between the first UE 115 and the second UE 115.

Figure 2:
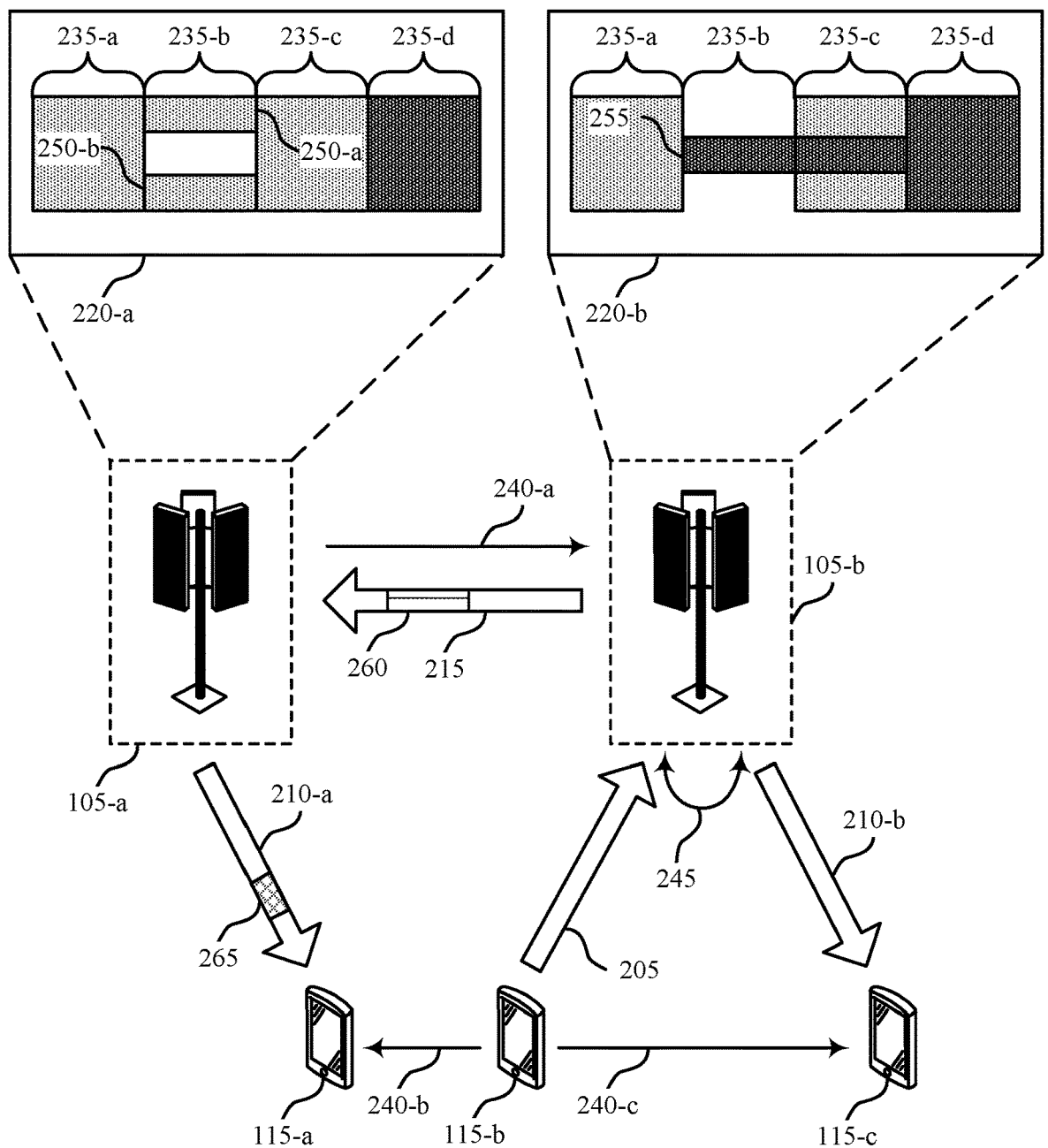
FIG. 2 illustrates an example of a wireless communications system that supports resource restrictions for SBFD and dynamic TDD operation in accordance with one or more aspects of the present disclosure.

FIG. 2 illustrates an example of a wireless communications systems 200 that supports resource restrictions for SBFD and dynamic TDD operation in accordance with one or more aspects of the present disclosure. In some examples, the wireless communications systems 200 may implement aspects of the wireless communication system 100. For example, the wireless communications system 200 may include one or more network entities 105 (e.g., a network entity 105-a and a network entity 105-b) and one or more UEs 115 (e.g., a UE 115-a and a UE 115-b), which may be examples of the corresponding devices as described with reference to FIG. 1. In the example of FIG. 2, the network entities 105 may be examples of a CU 160, a DU 165, an RU 170, a base station 140, an IAB node 104, or one or more other network nodes as described with reference to FIG. 1. The wireless communications systems 100 may include features for reduced CLI between the UEs 115 and the network, among other benefits.

In the examples of FIG. 2, the UEs 115 and the network entities 105 may communicate via one or more communication links 205, via one or more communication links 210 (e.g., a communication link 210-a and a communication link 210-b), and via one or more communication links 215. The communication links 205 may be examples of uplink communications links 205, the communication links 210 may be examples of downlink communication links 210, and the communication links 215 may be examples of backhaul communication links 215. Additionally, or alternatively, the communication links 205 and the communication links 210 may each be examples of a communication link 125 as described with reference to FIG. 1. The wireless communications system 200 may illustrate communication devices (e.g., one or more UEs 115, one or more network entities 105) operating in a full-duplex mode (e.g., performing full-duplex wireless communications) or a half-duplex TDD mode (e.g., performing half-duplex TDD wireless communications). That is, full-duplex or half-duplex TDD capabilities may be present at one or more network entities 105, one or more UEs 115, or both. For example, the wireless communications systems 200 may support TDD radio frequency bands (e.g., radio frequency spectrum bands configured for TDD communications), FDD radio frequency bands (e.g., radio frequency spectrum bands configured for FDD communications), full-duplex communications at one or more network entities 105 (and/or one or more UEs 115), half-duplex communications at one or more UE 115, or any combination thereof. In some examples, the wireless communications system 200 may support dynamic TDD (e.g., half-duplex dynamic TDD). That is, a communication device may support one or more flexible slots 235 which may be configured (e.g., dynamically) for downlink data 225 or uplink data 230.

In some examples, the wireless communications system 200 may support multiple types of full-duplex operations. For example, a communication device operating within the wireless communications systems 200 (e.g., a network entity 105, a UE 115) may support in-band full-duplex (IBFD) operations, sub-band FDD (SBFD) operations (e.g., frequency duplex operations), or both. In some examples of IBFD operations, the communication device may transmit and receive wireless communications on a same time and frequency resource (e.g., a same slot 235 and component carrier bandwidth). For example, downlink communications and uplink communications may share time and frequency resources (e.g., IBFD time and frequency resources). In some examples, the time and frequency resources may partially overlap or fully overlap. Additionally, or alternatively, for SBFD operations, the communications device may transmit and receive communications at over a same time resource and one or more different frequency resources. That is, the downlink resources may be separated from the uplink resource in the frequency domain.

In the example of FIG. 2, the network entity 105-b may support SBFD operations, such that downlink communications transmitted by the network entity 105-b (e.g., to the UE 115-c) may overlap in time with uplink communications received by the network entity 105-b (e.g., from the UE 115-b). In some examples, the network entity 105-b may configure communications for the UE 115-b and the UE 115-c according to a resource structure 220, such as a resource structure 220-b. The resource structure 220-b may include time domain resources (e.g., slots 235, symbols) allocated for downlink data 225 (e.g., a slot 235-a), time domain resources allocated for uplink data 230 (e.g., a slot 235-b and a slot 235-d), and one or more time domain resources allocated for both downlink data 225 and uplink data 230 (e.g., a slot 235-c).

In some examples, the time domain resources allocated for both downlink data 225 and uplink data 230 (e.g., the slot 235-c) may be referred to as D+U slots (or D+U symbols). In some examples, a D+U slot may include half-duplex symbols (e.g., downlink symbols or uplink symbols) or full-duplex symbols (e.g., both downlink symbols and uplink symbols). For example, the slot 235-c (e.g., D+U slots) may be examples of slots 235, in which a radio frequency band is used for both transmitting uplink communications (e.g., uplink transmissions) and transmitting downlink communications (e.g., downlink transmissions). In some examples, the uplink transmissions and the downlink transmissions may occur in overlapping bands (e.g., for IBFD operations) or adjacent bands (e.g., for SBFD operations).

For SBFD operations in which uplink transmissions and downlink transmissions occur in adjacent sub-bands, a half-duplex communication device may either transmit in an uplink radio frequency band or receive in a downlink radio frequency band. That is, for a given time domain resource (e.g., for a given D+U slot 235 or a given D+U symbol), such as slot 235-c, the half-duplex device (e.g., the UE 115-b, the UE 115-c) may transmit uplink data 230 (e.g., perform a PUSCH transmission) in an uplink radio frequency band or receive downlink data 225 in a downlink radio frequency band.

Additionally, or alternatively, for SBFD operations in which uplink and downlink transmissions occur in adjacent bands, a full-duplex device may transmit in the uplink radio frequency band and receive in the downlink radio frequency band. That is, for a given time domain resource (e.g., for a given D+U slot or a given D+U symbol), such as the slot 235-c, the full-duplex device (e.g., the network entity 105-b) may transmit uplink data 230 (e.g., perform a PUSCH transmission) in the uplink radio frequency band and receive downlink data 225 in the downlink radio frequency band.

Additionally, or alternatively, neighboring communication devices (e.g., neighboring UEs 115, neighboring network entities 105) may perform full-duplex communications or half-duplex TDD concurrently, such that communications received by a first communication device, such as the UE 115-a, may overlap in time with communications transmitted by a second communication device, such as the UE 115-b (e.g., a neighboring communication device). In such an example, the communications transmitted by the second communication device may interfere with the communications received at the first communication device. For example, the communications transmitted by the second communication device may lead to CLI (e.g., CLI 240-a, CLI 240-b, and CLI 240-c) at the first communications device.

In some examples, the network entity 105-b may be operating in a full-duplex mode (e.g., SBFD or IBFD) and the UEs 115 (e.g., the UE 115-b and the UE 115-c) may be operating in a half-duplex mode. For example, the network entity 105-b may receive uplink communications from the UE 115-b (e.g., via the communication link 205), while simultaneously transmitting downlink communications to the UE 115-c (e.g., via the communication link 210-b). In such an example, the full-duplex communications at the network entity 105-b may lead to self-interference 245. Additionally, or alternatively, the network entity 105-a and the network entity 105-b (e.g., neighboring network entities) may concurrently perform full-duplex communications or half-duplex TDD communications, such that downlink signals transmitted by the network entity 105-a may overlap with uplink signals received by the network entity 105-b, leading to the CLI 240-a. Additionally, or alternatively, the UE 115-a and the UE 115-b or the UE 115-b and the UE 115-c (e.g., neighboring UEs) may concurrently perform half-duplex TDD communications such that uplink signals transmitted by the UE 115-b may overlap with downlink signals received by the UE 115-a and/or the UE 115-c, which may lead to the CLI 240-b and/or the CLI 240-c.

Additionally, or alternatively, the wireless communications system 200 may support sub-band half-duplex (SBHD) operations (e.g., to enable dynamic TDD in FR1 macro cell deployment with flexible adaption of slot format based on traffic). For example, in the slot 235-b (e.g., asynchronous slot 235), the network entity 105-a may schedule a downlink transmission and the network entity 105-b may schedule an uplink transmission (e.g., traffic in different directions). Additionally, frequency resources of the slot 235-b may be split into one or more downlink sub-bands 250, such as a downlink sub-band 250-a and a downlink sub-band 250-b (e.g., in a resource structure 220-a), and one or more uplink sub-bands 255, such as an uplink sub-band 255. Accordingly, the network entity 105-a may transmit downlink data 225 to the UE 115-a via the downlink sub-band 250-a and the downlink sub-band 250-b and the network entity 105-b may receive uplink data 230 from the UE 115-c via the uplink sub-band 255 (e.g., providing frequency isolation between the UE 115-a and the UE 115-b thus reducing CLI 240-a).

In some cases, to reduce CLI, one or more network entities 105, such as the network entity 105-a and the network entity 105-b, may coordinate slot formats (e.g., SBFD format) in respective resource structures 220. For example, the network entities 115 may support coordination via a common (e.g., UE 115 dedicated) slot format (e.g., TDD-UL-DL slot format). However, one or more network entities 105 may change one or more slot formats to adapt (e.g., opportunistically) to uplink communications, downlink communications, or both. As such, the one or more network entities 105 may transmit, to respective UEs 115, control signaling indicating the one or more slot formats (e.g., RRC reconfiguring the one or more slot formats) based on each slot format change, resulting in increased overhead (e.g., inefficiencies).

Accordingly, to reduce interference within the wireless communications system 200, the network (e.g., one or more network entities 105) may employ resource restrictions for SBFD and dynamic TDD operations in accordance with the techniques described herein. For example, a first network entity 105, such as the network entity 105-b, may adapt (e.g., dynamically) one or more slot formats (e.g., SBFD formats) in the resource structure 220-b based on transmission of downlink data 225 to the UE 115-c (e.g., downlink traffic), reception of uplink data 230 from the UE 115-b (e.g., uplink traffic), or both. In some cases, the network entity 105-b may adapt (e.g., change) the resource structure 220-b periodically (e.g., every X frames). Accordingly, the network entity 105-b may transmit, to a second network entity, such as the network entity 105-a, coordination information 260 indicating one or more slot formats (e.g., SBFD formats), one or more slots 235 for restriction, or both (e.g., including information about semi-static signals). In such cases, the network entities 105 may operate according to a full-duplex mode (e.g., are full-duplex network entities 105) and the UEs 115 may operate according to a half-duplex mode (e.g., are half-duplex UEs 115).

The network entity 105-a may transmit, to the UE 115-a, a restriction indication 265 (e.g., via control signaling) based on the coordination information 260. In some examples, the restriction indication 265 may indicate (e.g., via a time and/or frequency pattern) one or more uplink resources, one or more downlink resources, or both, available for communications, restricted from communications, or both. That is, the UE 115-a may determine uplink slots 235, downlink slots 235, or both available for communications (e.g., for half-duplex operations) or may restrict full-duplex operations at the UE 115-a.

In some cases (e.g., SBFD operations), the restriction indication 265 may indicate that the UE 115-a is restricted from communicating via one or more uplink sub-bands 255 during a slot 235 or restricted from communicating via one or more downlink sub-bands 250 during the slot 235, as described with reference to FIG. 3A. In some other cases (e.g., dynamic TDD), the restriction indication 265 may indicate a respective sub-band configuration associated with each slot 235 associated with the UE 115-a, as described with reference to FIG. 3B. For example, the restriction indication 265 may indicate a first sub-band configuration associated with (e.g., for) a first slot 235, a second sub-band configuration associated with a second slot 235, and a third sub-band configuration associated with a third slot 235. In some examples, two or more of the first sub-band configuration, the second sub-band configuration, and the third sub-band configuration may be the same. Additionally, or alternatively, two or more of the first sub-band configuration, the second sub-band configuration, and the third sub-band configuration may be different. As such, the UE 115-a may communicate, with the network entity 105-*b*, based on the restriction indication 265.

In some cases, the UE 115-*a* may receive control signaling indicating multiple slot restriction configurations (e.g., patterns or masks). Each slot restriction configuration may be associated with a set of slots 235 (e.g., SBFD slots 235), where each slot 235 is further associated with a restriction. For example, (e.g., not depicted), the UE 115-*a* may be associated with three slots 235 (e.g., a first slot 235, a second slot 235, and a third slot 235), each associated with one or more downlink sub-bands 250 and one or more uplink sub-bands 255), which may be referred to as an SBFD slot 235. Accordingly, the UE 115-*a* may receive control signaling indicating a first slot restriction configuration (e.g., D-D-U) restricting the UE 115-*a* from communicating via the one or more uplink sub-bands 255 during the first slot 235 and the second slot 235 (e.g., allowing communications via the one or more downlink sub-bands 250 during the first slot 235 and the second slot 235) and restricting the UE 115-*a* from communicating via the one or more downlink sub-bands 250 during the third slot 235 (e.g., allowing communications via the one or more uplink sub-bands 255 during the third slot 235). Additionally, the control signaling may indicate a second slot restriction configuration (e.g., D-U-U) restricting the UE 115-*a* from communicating via the one or more uplink sub-bands 255 during the first slot 235 (e.g., allowing communications via the one or more downlink sub-bands 250 during the first slot 235) and restricting the UE 115-*a* from communicating via the one or more downlink sub-bands 250 during the second slot 235 and the third slot 235 (e.g., allowing communications via the one or more downlink sub-bands 250 during the second slot 235 and the third slot 235). In some examples, the control signaling may indicate a third slot restriction configuration (e.g., no restriction, default configuration) which may indicate no restrictions are to be applied to the three slots 235. Accordingly, the restriction indication 265 (e.g., via L1/L2 signaling) a restriction slot configuration of the multiple restriction slot configurations (e.g., the first slot restriction configuration, the second slot restriction configuration, and the third slot restriction configuration).

In some examples (e.g., SBFD operations), the network entity 105-*a* may transmit (e.g., via MAC-CE signaling) the restriction indication 265 indicating a single resource restriction configuration, which may also be referred to as a pattern of restrictions (e.g., a pattern of restricted or allowed downlink sub-bands 250 or uplink sub-bands 255). That is, the restriction indication 265 may include a cell identifier (e.g., serving-cellID) and a field indicating the pattern of restrictions. For example, the field may be a bitmap and each bit in the bitmap may be associated with a slot 235 in a set of slots 235. That is, a length of the bitmap may be associated with a quantity (e.g., number) of slots 235 (e.g., full-duplex slots, SBFD slots) associated with the pattern of restrictions, which may be referred to as a slot pattern. Additionally, a value of each bit in the bitmap may correspond to a restriction. For example, a first value (e.g., 0) may indicate the UE 115-*a* is restricted from communicating via the one or more uplink sub-bands 255 (e.g., allowing communications via the downlink sub-bands 250) during an associated slot 235 and a second value (e.g., 1) may indicate the UE 115-*a* is restricted from communicating via the one or more downlink sub-bands 250 (e.g., allowing communications via the one or more uplink sub-bands 255) during the associated slot 235. Additionally, or alternatively, the field indicating the pattern of restrictions may include multiple sub-fields, where each sub-field may be associated with a slot 235 in the set of slots 235. That is, a quantity of sub-fields may be associated with the quantity (e.g., number) of slots 235 (e.g., full-duplex slots, SBFD slots) associated with the slot pattern. Additionally, a value indicated in each sub-field may correspond to a restriction. For example, a first value (e.g., 0) may indicated no restrictions (e.g., allowing communications via the downlink sub-bands 250 and the uplink sub-bands 255) during an associated slot 235, a second value (e.g., 1) may indicate the UE 115-*a* is restricted from communicating via the one or more uplink sub-bands 255 (e.g., allowing communications via the downlink sub-bands 250) during an associated slot 235, and a third value may indicate the UE 115-*a* is restricted from communicating via the one or more downlink sub-bands 250 (e.g., allowing communications via the one or more uplink sub-bands 255) during the associated slot 235. In some cases, a fourth value (e.g., 3) may be associated with a configurable restriction (e.g., special case). For example, the fourth value may indicate the UE 115-*a* is allowed to communicate via the one or more uplink sub-bands 255 during the associated slot 235 according to a power backoff, via an indicated (e.g., or pre-configured beam), or both.

In some examples (e.g., SBFD operations), the network entity 105 may transmit the restriction indication 265 via UE-specific control signaling (e.g., UE-specific DCI). That is, the network entity 105 may transmit, to the UE 115-*a*, the restriction indication 265 via control signaling associated with the UE 115-*a*. In some cases, the control signaling may include a field (e.g., in a new DCI format) indicating a pattern of restrictions (e.g., a pattern of restricted or allowed downlink sub-bands 250 or uplink sub-bands 255), as described previously. In some other cases, the control signaling including the restriction indication 265 may be non-scheduling control signaling (e.g., non-scheduling DCI) and a field (e.g., an existing, unused field) in the non-scheduling control signaling may include the restriction indication 265.

Conversely, the network entity 105 may transmit the restriction indication 265 via group common control signaling. That is, the network entity 105-*a* may communicate with multiple UEs 115, including the UE 115-*a*, where the multiple UEs 115 belong to a group (e.g., a cell group). Accordingly, the network entity may transmit control signaling associated with the cell group, which may be referred to as group common control signaling, where the control signaling includes a restriction indication 265 for each UE 115 in the cell-group. That is, each UE 115 in the cell group may be associated (e.g., configured with) a position in the control signaling (e.g., DCIposition) and each position may include a restriction indication 265 associated with the respective UE 115 (e.g., similar to a slot format indicator (SFI)). For example, the UE 115-*a* may receive the group common control signaling associated with the cell group and may determine (e.g., read) the restriction indication 265 associated with the UE 115-*a* (e.g., based on a respective position in the group common control signaling).

In some cases, the UE 115-*a* may apply a restriction indicated via the restriction indication 265 based on a time threshold (e.g., minimum time requirement). That is, the UE 115-*a* may receive the restriction indication 265, decode the restriction indication 265, and apply the restriction indicated via the restriction indication 265 within the time threshold. In some examples (e.g., the restriction indication 265 is indicated via L1 signaling), the time threshold may be a first quantity (e.g., number) of slots 235, where the first quantity of slots 235 is greater than or equal to a second quantity of slots 235 associated with a monitoring periodicity (e.g., physical downlink control channel (PDCCH) monitoring periodicity) for control signaling (e.g., DCI) carrying the restriction indication 265 (e.g., similar to SFI). Additionally, or alternatively (e.g., the restriction indication 265 is indicated via L2 (MAC-CE) signaling), the time threshold may be a third quantity of slots 235 (e.g., n+3N) following a first slot 235 (e.g., n) of the one or more slots 235 comprising feedback information (e.g., hybrid automatic repeat request acknowledgment (HARQ-ACK)) in response to control signaling (e.g., MAC-CE) carrying the restriction indication 265. Further, the third quantity of slots 235 may be based on a fourth quantity of slots 235 (e.g., N) in a subframe associated with communications between the UE 115-a and the network entity 105-a.

Figure 3A:
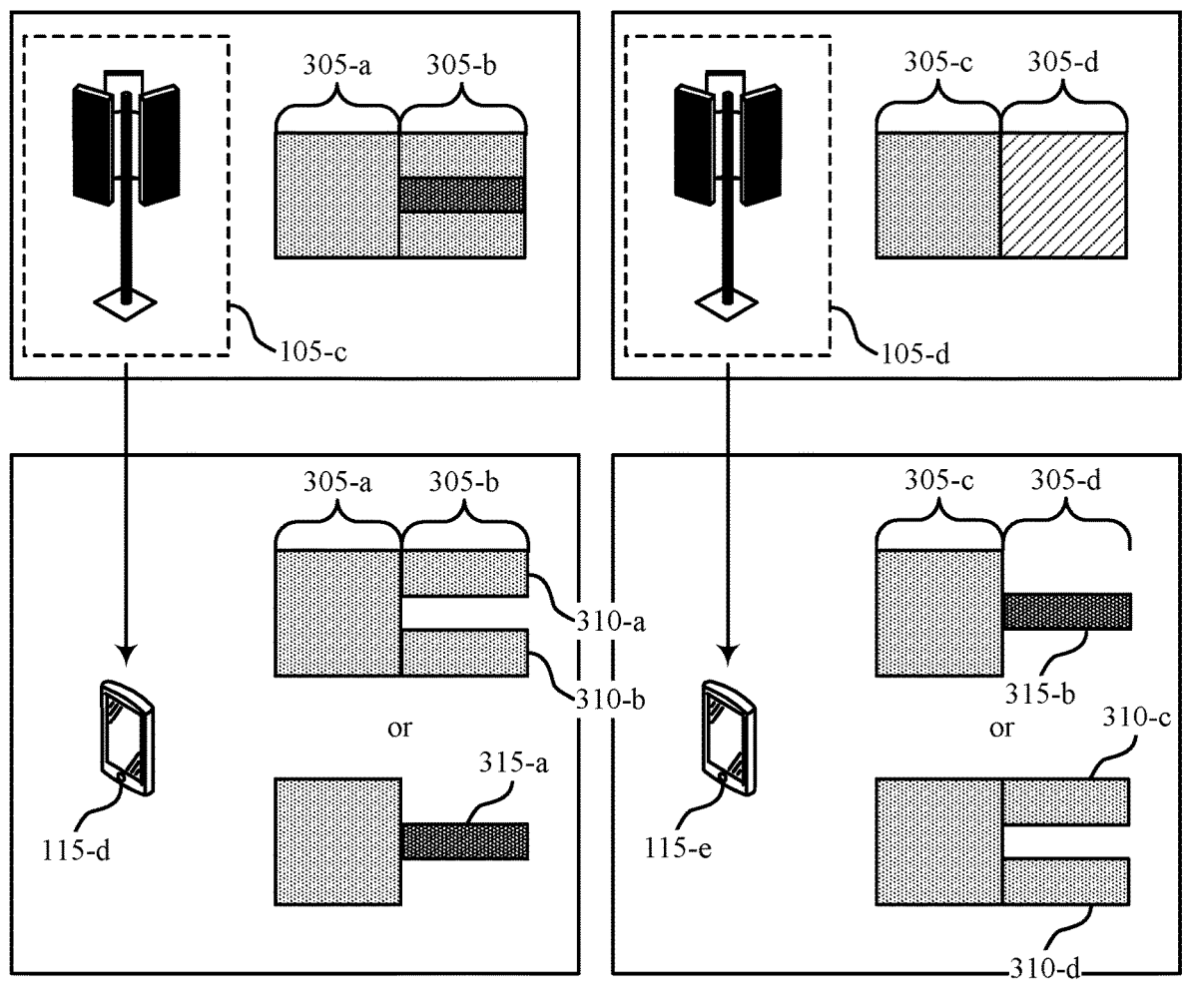
FIGS. 3A and 3B each illustrate an example of a resource restriction scenario that supports resource restrictions for SBFD and dynamic TDD operation in accordance with one or more aspects of the present disclosure.
Figure 3B:
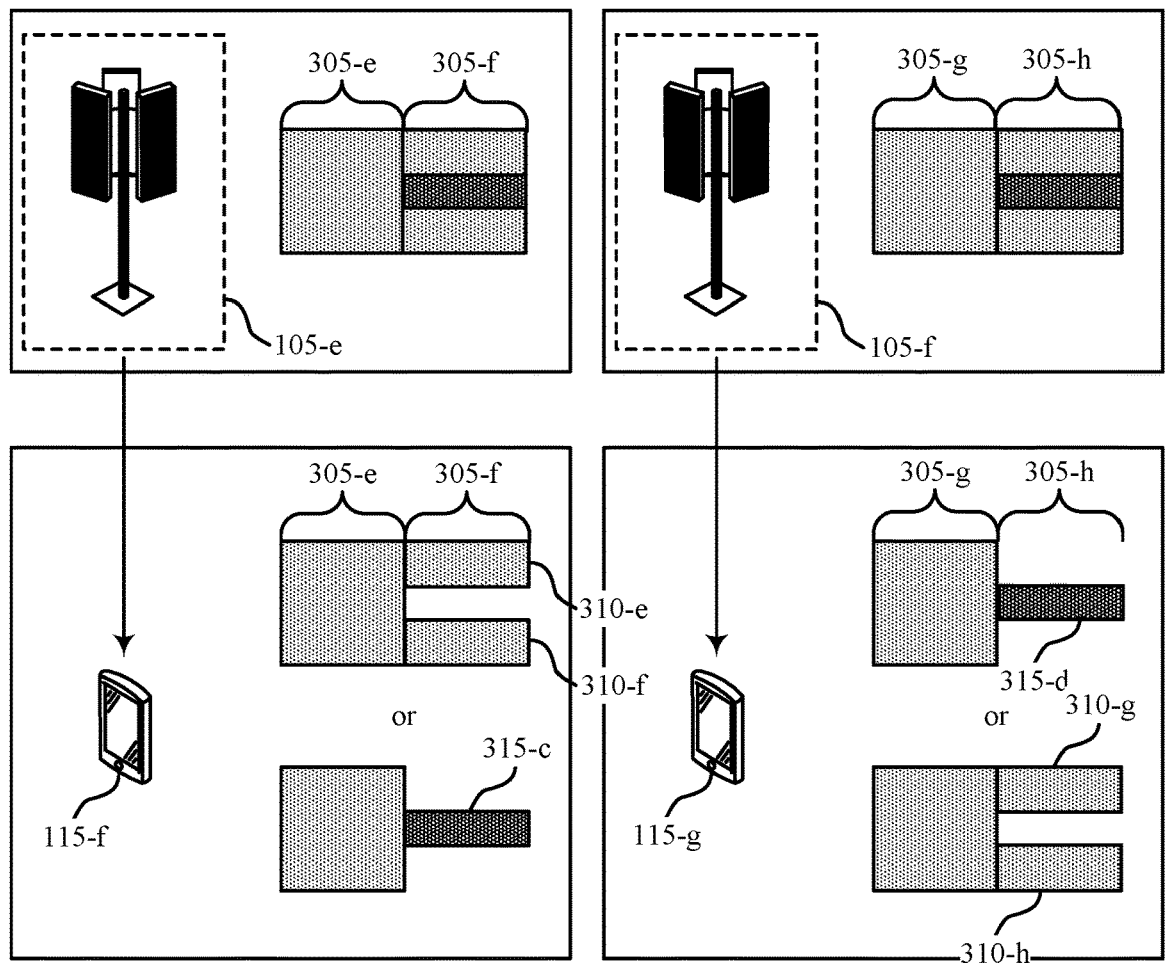

FIGS. 3A and 3B each illustrate an example of a resource restriction scenario 300, such as a resource restriction scenario 300-a and a resource restriction scenario 300-b, that supports resource restrictions for SBFD and dynamic TDD operation in accordance with one or more aspects of the present disclosure. In some examples, the resource restriction scenarios 300 (the resource restriction scenario 300-a and the resource restriction scenario 300-b) may implement or be implemented by aspects of the wireless communications system 100 and the wireless communications system 200. For example, the resource restriction scenarios 300 may each be implemented by a network entity 105 (e.g., a network entity 105-c, a network entity 105-d, a network entity 105-e, and a network entity 105-f) or a UE 115 (e.g., a UE 115-d, a UE 115-e, a UE 115-f, and a UE 115-g), which may be examples of the corresponding devices as described with reference to FIG. 1. In some examples of FIGS. 3A and 3B, the network entities 105 may be an example of a CU 160, a DU 165, an RU 170, a base station 140, an IAB node 104, or one or more other network nodes as described with reference to FIG. 1. The resource restriction scenarios 300 may include features for reduced CLI between the UEs 115 and the network, among other benefits.

In some cases, as depicted in FIG. 3A, a network entity 105-c may communicate with a UE 115-d during a slot 305-a and a slot 305-b and a network entity 105-d may communicate with a UE 115-e during a slot 305-c and a slot 305-d, where the slot 305-a overlaps in time with the slot 305-c and the slot 305-b overlaps in time with the slot 305-d. Additionally, the network entity 105-c and the UE 115-d may support SBFD operations, such that the slot 305-b may be an SBFD slot 305-b including multiple downlink sub-bands 310, such as a downlink sub-band 310-a and a downlink sub-band 310-b, and an uplink sub-band 315, such as an uplink sub-band 315-a. Further, the network entity 105-d and the UE 115-e may support dynamic TDD operations, such that the slot 305-d may be a TDD slot 305-d including a flexible sub-band 320. The flexible sub-band 320 may be configured as one or more downlink sub-bands 310 or one or more uplink sub-bands 315.

In some cases, the network entity 105-c may adapt a format of the slot 305-b to reduce CLI between the UE 115-d and the UE 115-e. For example, the network entity 105-c may select a first sub-band configuration (e.g., slot format) including the downlink sub-band 310-a and the downlink sub-band 310-b or a second sub-band configuration including the uplink sub-band 315-a. Additionally, the network entity 105-c may transmit, to the network entity 105-d, coordination information indicating the first sub-band configuration or the second sub-band configuration. The network entity 105-d may transmit, to the UE 115-e, control signaling indicating a restriction associated with the slot 305-d based on the coordination information. That is, the network entity 105-d may configure the UE 115-e such that SBHD is achieved between the UE 115-d and the UE 115-e in the slot 305-b and slot 305-d (e.g., if the TDD formats are not otherwise aligned or complementary).

For example, the network entity 105-c may transmit coordination information indicating the UE 115-d is restricted to communicating via the downlink sub-band 310-a and the downlink sub-band 310-b during the slot 305-b (e.g., the first sub-band configuration) and the network entity 105-d may transmit a restriction indication to the UE 115-e restricting downlink communications on the slot 305-d (e.g., indicating a set of symbols of the slot 305-d as uplink). That is, the UE 115-e may convert the flexible sub-band 320 into an uplink sub-band 315-b with a reduced set of frequency resources, such that the uplink sub-band 315-b does not overlap in the frequency domain with the downlink sub-band 310-a and the downlink sub-band 310-b. In some cases, the UE 115-e may refrain from receiving (e.g., cancel a reception of) downlink signaling (e.g., PDCCH, physical downlink shared channel (PDSCH), or channel state information references signal (CSI-RS)) based on a set of frequency resources associated with the downlink signaling overlapping, at least partially, with a set of frequency resources (e.g., the set of symbols of the slot 305-d) associated with the uplink sub-band 315-b (e.g., similar to uplink in TDD-UL-DL-common).

Conversely, the network entity 105-c may transmit coordination information indicating the UE 115-d is restricted to communicating via the uplink sub-band 315-a during the slot 305-b (e.g., the second sub-band configuration) and the network entity 105-d may transmit a restriction indication to the UE 115-e restricting uplink communications on the slot 305-d (e.g., indicating a set of symbols on the slot 305-d as downlink). That is, the UE 115-e may convert the flexible sub-band 320 into multiple downlink sub-bands 310, including a downlink sub-band 310-c and a downlink sub-band 310-d, with a reduced set of frequency resources, such that the downlink sub-band 310-c and the downlink sub-band 310-d do not overlap in the frequency domain with the uplink sub-band 315. In some cases, the UE 115-e may refrain from transmitting (e.g., cancel transmission of) uplink signaling (e.g., physical uplink control channel (PUCCH), physical uplink shared channel (PUSCH), physical random access channel (PRACH), or sounding reference signal (SRS)) based on a set of frequency resources associated with the uplink signaling overlapping, at least partially, with a set of frequency resources (e.g., the set of symbols of the slot 305-d) associated with the downlink sub-band 310-c, the downlink sub-band 310-d, or both (e.g., similar to downlink in TDD-UL-DL-common).

In some cases, as depicted in FIG. 3B, a network entity 105-e may communicate with a UE 115-f during a slot 305-e and a slot 305-f and a network entity 105-f may communicate with a UE 115-g during a slot 305-g and a slot 305-h, where the slot 305-e overlaps in time with the slot 305-g and the slot 305-f overlaps in time with the slot 305-h. Additionally, the network entity 105-e, the network entity 105-f, the UE 115-f, and the UE 115-g may support SBFD operations, such that the slot 305-f and the slot 305-h may be an SBFD slot 305-f and an SBFD slot 305-h, respectively. That is, the slot 305-f may include multiple downlink sub-bands 310, such as a downlink sub-band 310-e and a downlink sub-band 310-f, and an uplink sub-band 315, such as an uplink sub-band 315-c. Additionally, the slot 305-h may include multiple downlink sub-bands 310, such as a downlink sub-band 310-g and a downlink sub-band 310-h, and an uplink sub-band 315, such as an uplink sub-band 315-d.

In some cases, the network entity 105-*e* may adapt a format of the slot 305-*f* to reduce CLI between the UE 115-*f* and the UE 115-*g*. For example, the network entity 105-*e* may select a first sub-band configuration (e.g., slot format) including the downlink sub-band 310-*e* and the downlink sub-band 310-*f* or a second sub-band configuration including the uplink sub-band 315-*c*. Additionally, the network entity 105-*e* may transmit, to the network entity 105-*f*, coordination information indicating the first sub-band configuration or the second sub-band configuration. The network entity 105-*f* may transmit, to the UE 115-*g*, control signaling indicating a restriction associated with the slot 305-*h* based on the coordination information. That is, the network entity 105-*f* may configure the UE 115-*g* such that SBHD is achieved between the UE 115-*f* and the UE 115-*g* in the slot 305-*f* and slot 305-*g*.

For example, the network entity 105-*e* may transmit coordination information indicating the UE 115-*f* is restricted to communicating via the downlink sub-band 310-*e* and the downlink sub-band 310-*f* during the slot 305-*f* (e.g., the first sub-band configuration) and the network entity 105-*f* may transmit a restriction indication to the UE 115-*g* restricting downlink communications on the slot 305-*h* (e.g., indicating a set of symbols of the slot 305-*h* as uplink). That is, the UE 115-*g* may allow scheduling (e.g., only) on the uplink sub-band 315-*d* during the slot 305-*h*, where the uplink sub-band 315-*d* does not overlap in the frequency domain with the downlink sub-band 310-*e* and the downlink sub-band 310-*f*. In some cases, the UE 115-*e* may refrain from receiving (e.g., cancel a reception of) downlink signaling (e.g., PDCCH, PDSCH, or CSI-RS) based on a set of frequency resources associated with the downlink signaling overlapping, at least partially, with a set of frequency resources (e.g., the set of symbols of the slot 305-*h*) associated with the uplink sub-band 315-*d*.

In some other cases (e.g., for scheduling flexibility), the UE 115-*g* may receive (e.g., the network entity 105-*f* may schedule) the downlink signaling based on one or more rules associated with the restriction indication (e.g., may override a restriction based on the one or more rules). For example, a first rule of the one or more rules may permit the UE 115-*g* to receive periodic downlink signaling, semi-periodic downlink signaling, or both (e.g., regardless of overlapping resources). That is, the UE 115-*g* may receive the downlink signaling associated with the set of frequency resources that overlap, at least partially, with the set of frequency resources associated with the uplink sub-band 315-*d* based on the downlink signaling being periodic downlink signaling or semi-periodic downlink signaling. Additionally, or alternatively, a second rule of the one or more rules may permit the UE 115-*g* to receive downlink signaling associated with a defined set of signal types (e.g., tracking reference signals (TRSs)). That is, the UE 115-*g* may receive the downlink signaling associated with the set of frequency resources that overlap, at least partially, with the set of frequency resources associated with the uplink sub-band 315-*d* based on the downlink signaling being associated with a signal type of the defined set of signal types.

Conversely, the network entity 105-*e* may transmit coordination information indicating the UE 115-*f* is restricted to communicating via the uplink sub-band 315-*c* during the slot 305-*f* (e.g., the second sub-band configuration) and the network entity 105-*f* may transmit a restriction indication to the UE 115-*g* restricting uplink communications on the slot 305-*h* (e.g., indicating a set of symbols of the slot 305-*h* as downlink). That is, the UE 115-*g* may allow scheduling (e.g., only) on the downlink sub-band 310-*g* and the downlink sub-band 310-*g* during the slot 305-*h*, where the downlink sub-band 310-*g* and the downlink sub-band 310-*g* do not overlap in the frequency domain with the uplink sub-band 315-*c*. In some cases, the UE 115-*e* may refrain from transmitting (e.g., cancel transmission of) uplink signaling (e.g., PUCCH, PUSCH, PRACH, or SRS) based on a set of frequency resources associated with the uplink signaling overlapping, at least partially, with a set of frequency resources (e.g., the set of symbols of the slot 305-*h*) associated with the downlink sub-band 310-*g*, the downlink sub-band 310-*h*, or both.

In some other cases (e.g., for scheduling flexibility), the UE 115-*g* may transmit (e.g., the network entity 105-*f* may schedule) the uplink signaling based on the one or more rules associated with the restriction indication (e.g., may override a restriction based on the one or more rules). For example, a third rule of the one or more rules may permit the UE 115-*g* to transmit periodic uplink signaling, semi-periodic uplink signaling, or both (e.g., regardless of overlapping resources). That is, the UE 115-*g* may transmit the uplink signaling associated with the set of frequency resources that overlap, at least partially, with the set of frequency resources associated with the downlink sub-band 310-*g*, the downlink sub-band 310-*h*, or both, based on the uplink signaling being periodic uplink signaling or semi-periodic uplink signaling. Additionally, or alternatively, a fourth rule of the one or more rules may permit the UE 115-*g* to transmit uplink signaling associated with the defined set of signal types (e.g., semi-periodic CSI on PUCCH). That is, the UE 115-*g* may transit the uplink signaling associated with the set of frequency resources that overlap, at least partially, with the set of frequency resources associated with the downlink sub-band 310-*g*, the downlink sub-band 310-*h*, or both, based on the uplink signaling being associated with a signal type of the defined set of signal types.

In some examples, the restriction indication 265 may indicate a restricted transmit power (e.g., max transmit power), one or more restricted beams (e.g., transmission configuration indicator (TCI) state or spatial relation information), or both. That is, the UE 115-*g* may transmit the uplink signaling associated with the set of frequency resources that overlap, at least partially, with the set of frequency resources associated with the downlink sub-band 310-*g*, the downlink sub-band 310-*h*, or both, according to the restricted transmit power, the restricted beams, or both. For example, the restriction indication 265 may indicate that the UE 115-*g* is permitted to transmit the uplink signaling associated with the set of frequency resources that overlap, at least partially, with the set of frequency resources associated with the downlink sub-band 310-*g*, the downlink sub-band 310-*h*, or both (e.g., in a slot 305 associated with an uplink restriction) at a transmit power less than or equal to the restricted transmit power. Similarly, the restriction indication 265 may indicate that the UE 115-*g* is permitted to transmit the uplink signaling associated with the set of frequency resources that overlap, at least partially, with the set of frequency resources associated with the downlink sub-band 310-*g*, the downlink sub-band 310-*h*, or both (e.g., in a slot 305 associated with an uplink restriction) via a transmit beam from the one or more restricted beams.

Figure 4:
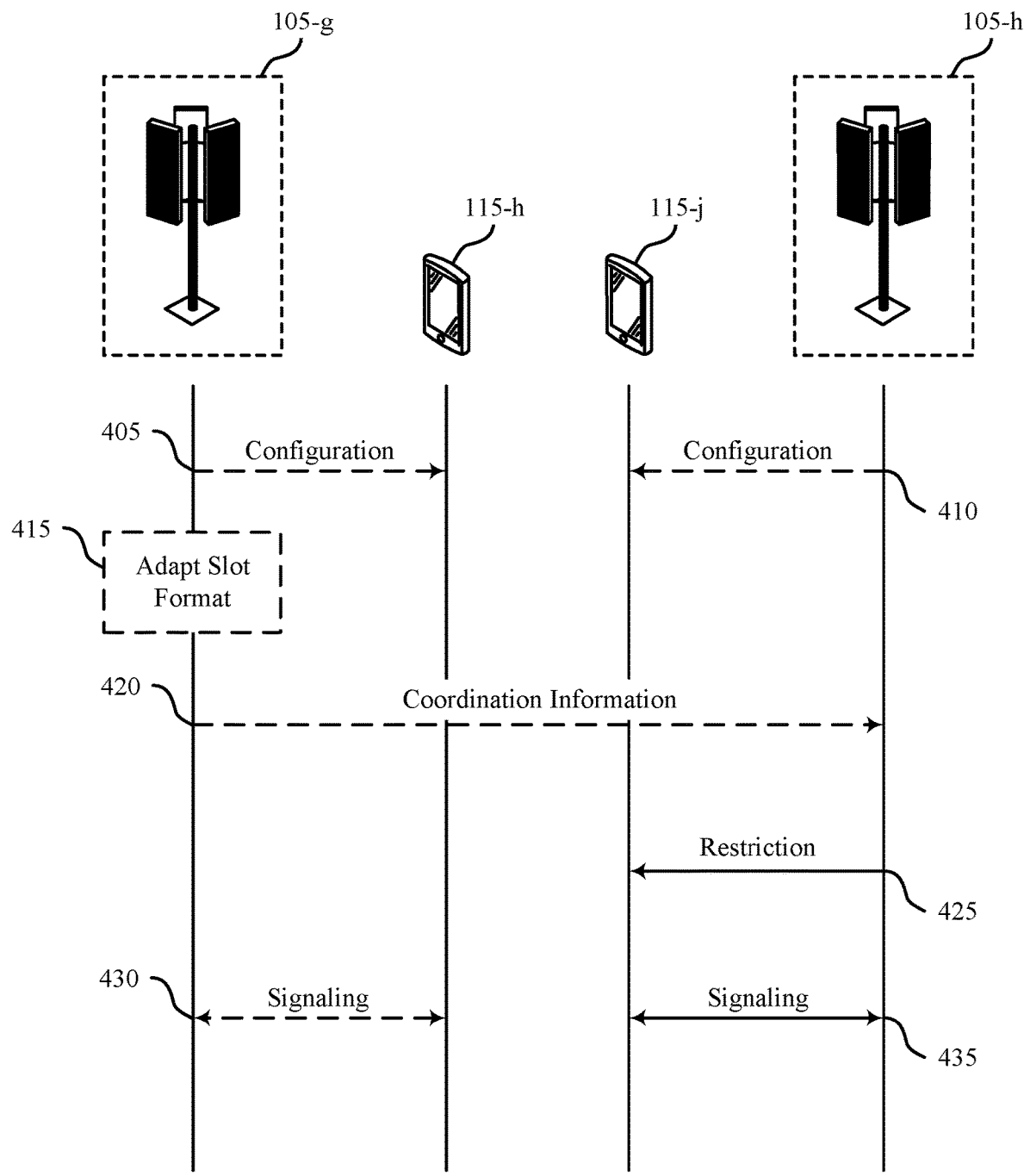
FIG. 4 illustrates an example of a process flow that supports resource restrictions for SBFD and dynamic TDD operation in accordance with one or more aspects of the present disclosure.

FIG. 4 illustrates an example of a process flow 400 that supports resource restrictions for SBFD and dynamic TDD operation in accordance with one or more aspects of the present disclosure. In some examples, the process flow 400 may implement or be implemented by aspects of the wireless communications system 100, the wireless communications system 200, and the resource restriction scenarios 300.

For example, the process flow 400 may be implemented by a network entity 105 (e.g., a network entity 105-g, and a network entity 105-h) or a UE 115 (e.g., a UE 115-h and a UE 115-j), which may be examples of the corresponding devices as described with reference to FIG. 1. In some examples of FIG. 4, the network entities 105 may be an example of a CU 160, a DU 165, an RU 170, a base station 140, an IAB node 104, or one or more other network nodes as described with reference to FIG. 1. The process flow 400 may include features for reduced CLI between the UEs 115 and the network, among other benefits.

In some cases, at 405 and 410, each network entity 105 may configure (e.g., RRC configure) one or more slots of respective UEs 115 according to one or more slot formats (e.g., SBFD slot formats), which may also be referred to as sub-band configurations. For example, at 405, the network entity 105-g may transmit, to the UE 115-h, an indication of a first set of slot formats to be applied to one or more slots associated with communications between the UE 115-h and the network entity 105-g. Additionally, at 410, the network entity 105-h may transmit, to the UE 115-j, an indication of a second set of slot formats to be applied to one or more slots associated with communications between the UE 115-j and the network entity 105-h. In some cases, the network entity 105-h may transmit, to the UE 115-j, an indication of a multiple slot restriction configurations to one or more slots associated with communications between the UE 115-j and the network entity 105-h.

In some cases, at 415, the network entity 105-g may adapt one or more slot formats of one or more slots associated with communications between the UE 115-h and the network entity 105-g. based on communications between the UE 115-h and the network entity 105-g (e.g., based on uplink traffic, downlink traffic, or both).

Accordingly, at 420, the network entity 105-g may transmit, to the network entity 105-h, coordination information indicating the one or more adapted slots, the one more adapted slot formats, or both, associated with communications of the UE 115-h, wherein the restriction to the one or more slots associated with communications of the UE is based at least in part on the coordination information At 425, the network entity 105-h may transmit, to the UE 115-j, control signaling indicating a restriction to one or more slots associated with communications between the UE 115-j and the network entity 105-h, where each of the one or more slots is associated with one or more sub-bands. Additionally, the restriction may modify an availability or a duplexing setting for at least a portion of the one or more sub-bands, may be based on the coordination information, or both.

In some examples, the control signaling may indicate that the restriction applies to a first slot of the one or more slots associated with communications between the UE 115-j and the network entity 105-h. As such, the UE 115-j may modify the duplexing setting by restricting the UE 115-j from communicating via one or more uplink sub-bands during the first slot or by restricting the UE 115-j from communicating via one or more downlink sub-bands during the first slot.

In some examples, the control signaling may indicate respective sub-band configurations associated with each of the one or more slots associated with communications between the UE 115-j and the network entity 105-h. Additionally, each sub-band configuration may indicate a subset of available frequency resources from a set of frequency resources associated with a respective slot of the one or more slots associated with communications between the UE 115-j and the network entity 105-h. As such, the UE 115-j may modify the availability of the at least portion of the one or more sub-bands associated with communications between the UE 115-j and the network entity 105-h is based on the respective sub-band configurations.

In some cases, the control signaling may indicate a first slot restriction configuration of the multiple slot restriction configurations. Additionally, or alternatively, the control signaling may be a broadcast communication indicating one or more restricted time resources, one or more restricted frequency resources, or both, associated with the one or more slots.

The control signaling may include a field indicating the restriction. In some cases, the field may include a bitmap indicating the restriction. In such cases, each bit in the bitmap may be associated with a respective slot of the one or more slots and each bit in the bitmap may indicate an uplink restriction to the respective slot of the one or more slots or a downlink restriction to the respective slot of the one or more slots. In some other cases, the field may include one or more subfields indicating the restriction. In such cases, each sub-field may indicate an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof. In some cases, the field in the control signaling may indicate a pattern of one or more uplink resource restrictions to the one or more slots, one or more downlink resource restriction to the one or more slots, or both, where the restriction is based on the pattern.

In some examples, the control signaling may include respective restrictions associated with multiple UEs 115, and where the UE 115-j determines the restriction to the one or more slots associated with communications between the UE 115-j and the network entity 105-h based on a position of the indication of the restriction within the control signaling. Conversely, the control signaling may indicate a UE 115-j specific restriction.

At 430, the UE 115-h may communicate with the network entity 105-g in accordance with the one or more adapted slot formats of one or more slots associated with communications between the UE 115-h and the network entity 105-g.

At 435, the UE 115-j may communicate with the network entity 105-h via at least a subset of the one or more sub-bands of the one or more slots associated with communications between the UE 115-j and the network entity 105-h in accordance with the restriction.

In some cases, the UE 115-j may cancel a reception of downlink signaling via the one or more downlink sub-bands based on an overlap between a first set of resources associated with the downlink signaling and a second set of resources associated with the one or more downlink sub-bands. Additionally, or alternatively, the UE 115-j may cancel a transmission of uplink signaling via the one or more uplink sub-bands based on an overlap between a first set of resources associated with the uplink signaling and a second set of resources associated with the one or more uplink sub-bands. In some examples, the downlink signaling, the uplink signaling, or both may be associated with semi-periodic scheduling, periodic scheduling, or both.

In some cases, the UE 115-j may receive downlink signaling via the one or more downlink sub-bands in accordance with one or more rules associated with the restriction, where the downlink signaling is associated with a first set of resources that partially overlaps with a second set of resources associated with the one or more downlink sub-bands. For example, the one or more rules may include a first rule permitting the UE 115-j to receive periodic downlink signals, semi-periodic downlink signals, or both, via the one or more restricted downlink sub-bands, a second rule permitting the UE 115-j to receive signaling associated with a defined set of signal types via the one or more restricted downlink sub-bands, or a combination thereof.

Additionally, or alternatively, the UE 115-j may transmit uplink signaling via the one or more uplink sub-bands in accordance with the one or more rules associated with the restriction, wherein the uplink signaling is associated with a third set of resources that partially overlaps with a fourth set of resources associated with the one or more uplink sub-bands. For example, the one or more rules may include a third rule permitting the UE 115-j to transmit periodic uplink signals, semi-periodic uplink signals, or both, via the one or more uplink restricted sub-bands, a fifth rule permitting the UE 115-j to transmit signaling associated with a defined set of signal types via the one or more uplink restricted sub-bands, or a combination thereof.

In some examples, the UE 115-j may transmit, to the network entity 105-h, or receive, from the network entity 105-h, one or more transmissions based on the one or more transmissions being associated with a set of frequency resources within a subset of available frequency resources associated with a sub-band configurations indicated via the control signaling. Conversely, the UE 115-j may cancel a transmission or reception of one or more transmissions associated with a set of frequency resources that falls at least partially outside of the subset of available frequency resources.

Additionally, or alternatively, the UE 115-j may transmit uplink signaling via at least a subset of the one or more slots (e.g., via an uplink restricted slot) according to the one or more parameters associated with the transmit power, the one or more parameters associated with the transmit beam, or both.

In some examples, the UE 115-j may modify the availability or duplexing setting for the at least portion of the one or more sub-bands based on a time threshold. The time threshold may be associated with a first quantity of slots that is greater than or equal to a second quantity of slots associated with a monitoring periodicity for the control signaling. Additionally, or alternatively, the time threshold may be associated with a third quantity of slots following a first slot of the one or more slots comprising feedback information associated with the control signaling, where the third quantity of slots is based on a fourth quantity of slots in a subframe associated with communications between the UE 115-j and the network entity 105-h.

Figure 5:
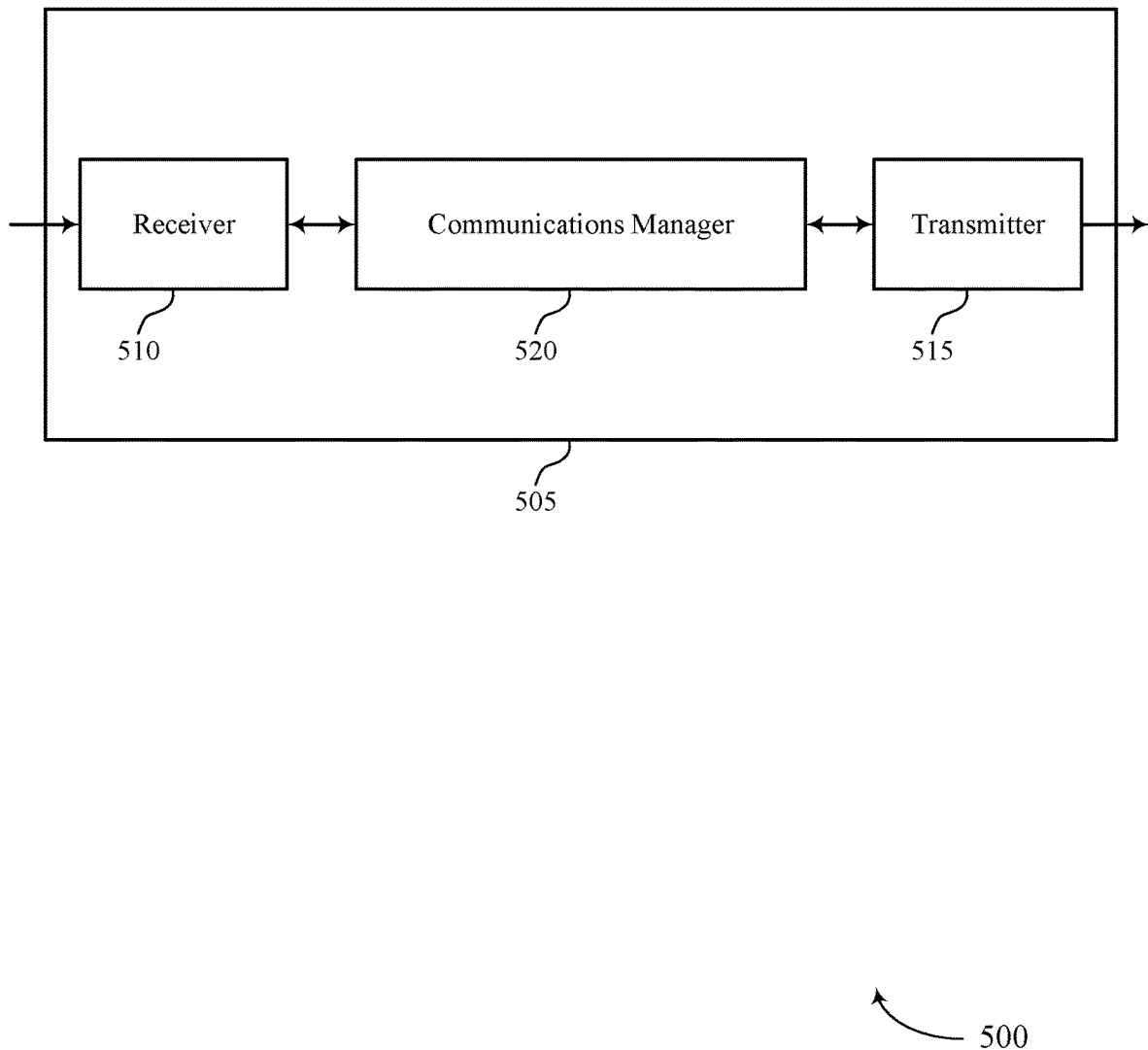
FIGS. 5 and 6 show block diagrams of devices that support resource restrictions for SBFD and dynamic TDD operation in accordance with one or more aspects of the present disclosure.

FIG. 5 shows a block diagram 500 of a device 505 that supports resource restrictions for SBFD and dynamic TDD operation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource restrictions for SBFD and dynamic TDD operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource restrictions for SBFD and dynamic TDD operation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of resource restrictions for SBFD and dynamic TDD operation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands. The communications manager 520 may be configured as or otherwise support a means for communicating with the network entity via at least a subset of the one or more sub-bands of the one or more slots in accordance with the restriction.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for CLI mitigation via resource restrictions for SBFD and dynamic TDD operation which may result in reduced processing, reduced power consumption, and more efficient utilization of communication resources, among other advantages.

Figure 6:
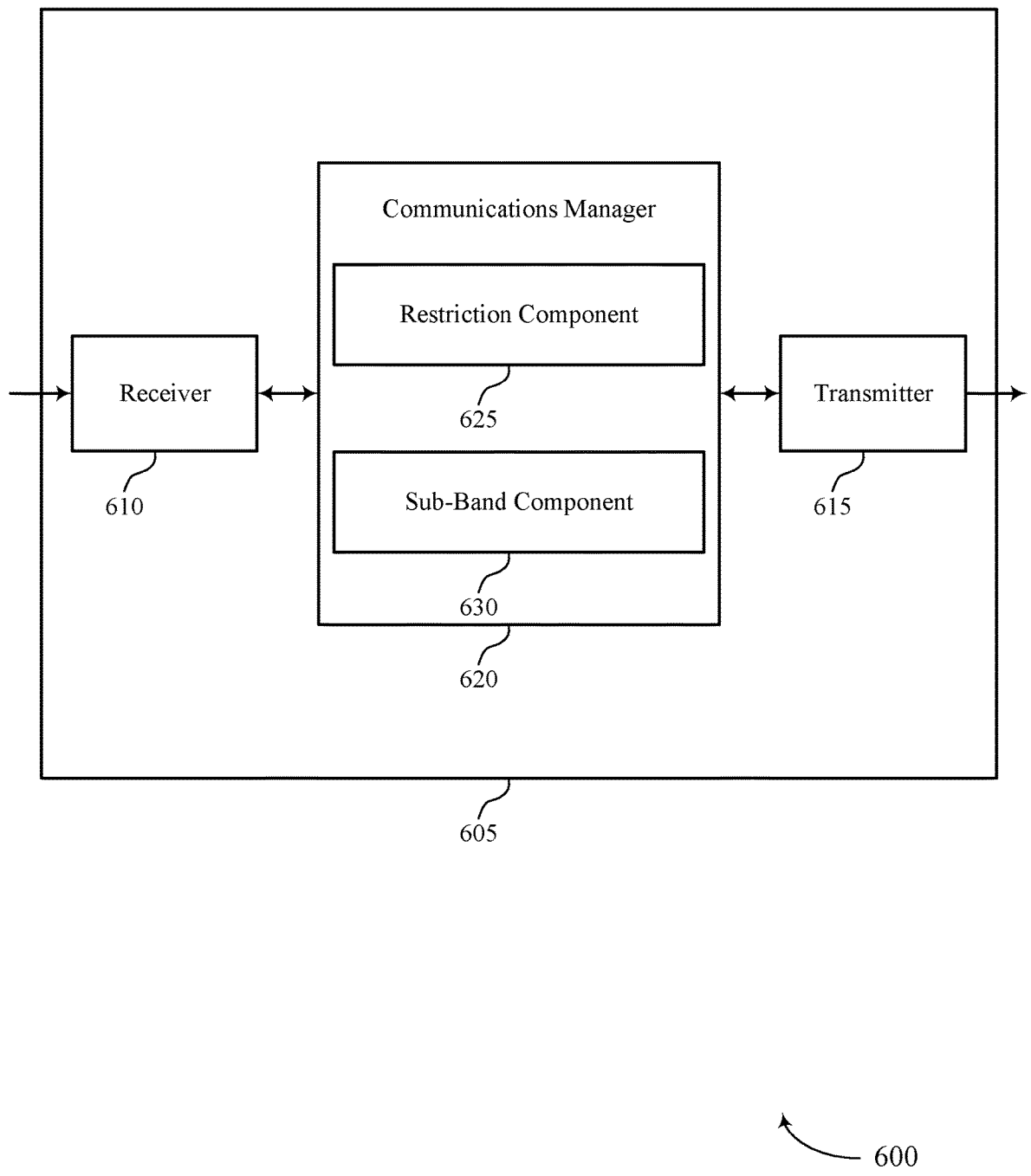

FIG. 6 shows a block diagram 600 of a device 605 that supports resource restrictions for SBFD and dynamic TDD operation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource restrictions for SBFD and dynamic TDD operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource restrictions for SBFD and dynamic TDD operation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resource restrictions for SBFD and dynamic TDD operation as described herein. For example, the communications manager 620 may include a restriction component 625 a sub-band component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The restriction component 625 may be configured as or otherwise support a means for receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands. The sub-band component 630 may be configured as or otherwise support a means for communicating with the network entity via at least a subset of the one or more sub-bands of the one or more slots in accordance with the restriction.

Figure 7:
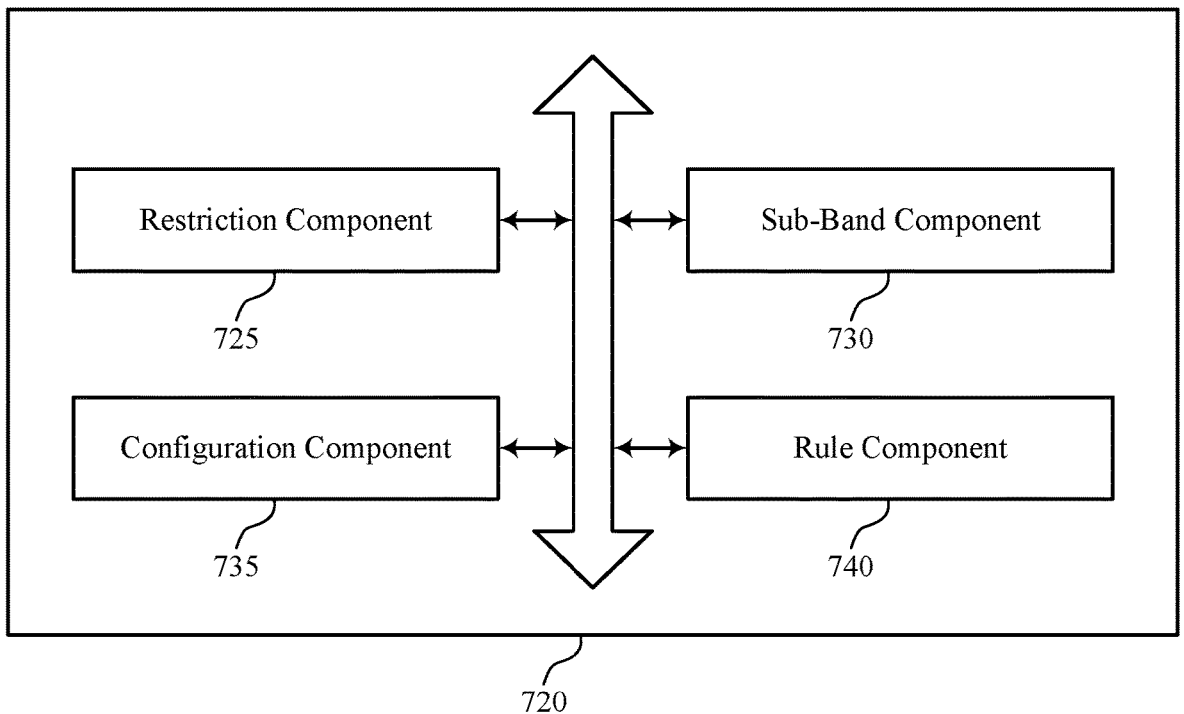
FIG. 7 shows a block diagram of a communications manager that supports resource restrictions for SBFD and dynamic TDD operation in accordance with one or more aspects of the present disclosure.

FIG. 7 shows a block diagram 700 of a communications manager 720 that supports resource restrictions for SBFD and dynamic TDD operation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of resource restrictions for SBFD and dynamic TDD operation as described herein. For example, the communications manager 720 may include a restriction component 725, a sub-band component 730, a configuration component 735, a rule component 740, or any combination thereof. Each of these components may communicate, directly or indirectly, with one another (e.g., via one or more buses).

The communications manager 720 may support wireless communications at a UE in accordance with examples as disclosed herein. The restriction component 725 may be configured as or otherwise support a means for receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands. The sub-band component 730 may be configured as or otherwise support a means for communicating with the network entity via at least a subset of the one or more sub-bands of the one or more slots in accordance with the restriction.

In some examples, to support receiving the control signaling, the restriction component 725 may be configured as or otherwise support a means for receiving an indication that the restriction applies to a first slot of the one or more slots, where modifying the duplexing setting includes restricting the UE from communicating via one or more uplink sub-bands during the first slot or restricting the UE from communicating via one or more downlink sub-bands during the first slot.

In some examples, to support communicating with the network entity via the at least subset of the one or more sub-bands of the one or more slots in accordance with the restriction, the restriction component 725 may be configured as or otherwise support a means for canceling a reception of downlink signaling via the one or more downlink sub-bands based on an overlap between a first set of resources associated with the downlink signaling and a second set of resources associated with the one or more downlink sub-bands.

In some examples, the downlink signaling is associated with periodic signaling or semi-periodic signaling.

In some examples, to support communicating with the network entity via the at least subset of the one or more sub-bands of the one or more slots in accordance with the restriction, the restriction component 725 may be configured as or otherwise support a means for canceling a transmission of uplink signaling via the one or more uplink sub-bands based on an overlap between a first set of resources associated with the uplink signaling and a second set of resources associated with the one or more uplink sub-bands. In some examples, the uplink signaling is associated with periodic signaling or semi-periodic signaling.

In some examples, to support communicating with the network entity via the at least subset of the one or more sub-bands of the one or more slots in accordance with the restriction, the rule component 740 may be configured as or otherwise support a means for receiving downlink signaling via the one or more downlink sub-bands in accordance with one or more rules associated with the restriction, where the downlink signaling is associated with a first set of resources that partially overlaps with a second set of resources associated with the one or more downlink sub-bands.

In some examples, the one or more rules includes a first rule permitting the UE to receive periodic downlink signals, semi-periodic downlink signals, or both, via the one or more restricted downlink sub-bands, a second rule permitting the UE to receive signaling associated with a defined set of signal types via the one or more restricted downlink sub-bands, or a combination thereof.

In some examples, to support communicating with the network entity via the at least subset of the one or more sub-bands of the one or more slots in accordance with the restriction, the rule component 740 may be configured as or otherwise support a means for transmitting uplink signaling via the one or more uplink sub-bands in accordance with one or more rules associated with the restriction, and where the uplink signaling is associated with a first set of resources that partially overlaps with a second set of resources associated with the one or more uplink sub-bands.

In some examples, the one or more rules includes a first rule permitting the UE to transmit periodic uplink signals, semi-periodic uplink signals, or both, via the one or more uplink restricted sub-bands, a fourth rule permitting the UE to transmit signaling associated with a defined set of signal types via the one or more uplink restricted sub-bands, or a combination thereof.

In some examples, to support receiving the control signaling indicating the restriction, the configuration component 735 may be configured as or otherwise support a means for receiving an indication of respective sub-band configurations associated with each of the one or more slots, where modifying the availability of the at least portion of the one or more sub-bands is based on the respective sub-band configurations.

In some examples, to support communicating with the network entity, the restriction component 725 may be configured as or otherwise support a means for transmitting, to the network entity, or receiving, from the network entity, one or more transmissions based on the one or more transmissions being associated with a set of frequency resources within the subset of available frequency resources.

In some examples, to support communicating with the network entity, the restriction component 725 may be configured as or otherwise support a means for cancelling a transmission or reception of one or more transmissions associated with a set of frequency resources that falls at least partially outside of the subset of available frequency resources.

In some examples, the configuration component 735 may be configured as or otherwise support a means for receiving a second control signaling indicating a set of multiple slot restriction configurations to the one or more slots associated with communications between the UE and the network entity, where the control signaling indicating the restriction to the one or more slots includes an indication of a first slot restriction configuration of the set of multiple slot restriction configurations.

In some examples, to support receiving the control signaling indicating the restriction, the restriction component 725 may be configured as or otherwise support a means for receiving a broadcast communication indicating one or more restricted time resources, one or more restricted frequency resources, or both, associated with the one or more slots, where communicating with the network entity is based on the one or more restricted time resources, the one or more restricted frequency resources, or both.

In some examples, to support receiving the control signaling indicating the restriction, the restriction component 725 may be configured as or otherwise support a means for receiving a bitmap via the field indicating the restriction, where each bit in the bitmap is associated with a respective slot of the one or more slots, and where each bit in the bitmap indicates an uplink restriction to the respective slot of the one or more slots or a downlink restriction to the respective slot of the one or more slots.

In some examples, to support receiving the control signaling indicating the restriction, the restriction component 725 may be configured as or otherwise support a means for receiving an indication of one or more sub-fields of the field indicating the restriction, where each sub-field is associated with a respective slot of the one or more slots, and where each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

In some examples, to support communicating with the network entity via the at least subset of the one or more sub-bands of the one or more slots in accordance with the restriction, the sub-band component 730 may be configured as or otherwise support a means for transmitting uplink signaling via at least a subset of the one or more slots according to the one or more parameters associated with the transmit power, the one or more parameters associated with the transmit beam, or both.

In some examples, the control signaling includes respective restrictions associated with a set of multiple UEs. In some examples, the UE determines the restriction to the one or more slots associated with communications between the UE and the network entity based on a position of the indication of the restriction within the control signaling.

In some examples, to support receiving the control signaling indicating the restriction, the restriction component 725 may be configured as or otherwise support a means for receiving an indication of a pattern of one or more uplink resource restrictions to the one or more slots, one or more downlink resource restriction to the one or more slots, or both, where the restriction is based on the pattern, and where the control signaling includes a field indicating the pattern.

In some examples, modifying the availability or the duplexing setting for the at least portion of the one or more sub-bands is based on a time threshold. In some examples, the time threshold is associated with a first quantity of slots that is greater than or equal to a second quantity of slots associated with a monitoring periodicity for the control signaling or the time threshold is associated with a third quantity of slots following a first slot of the one or more slots including feedback information associated with the control signaling. In some examples, the third quantity of slots is based on a fourth quantity of slots in a subframe associated with communications between the UE and the network entity.

Figure 8:
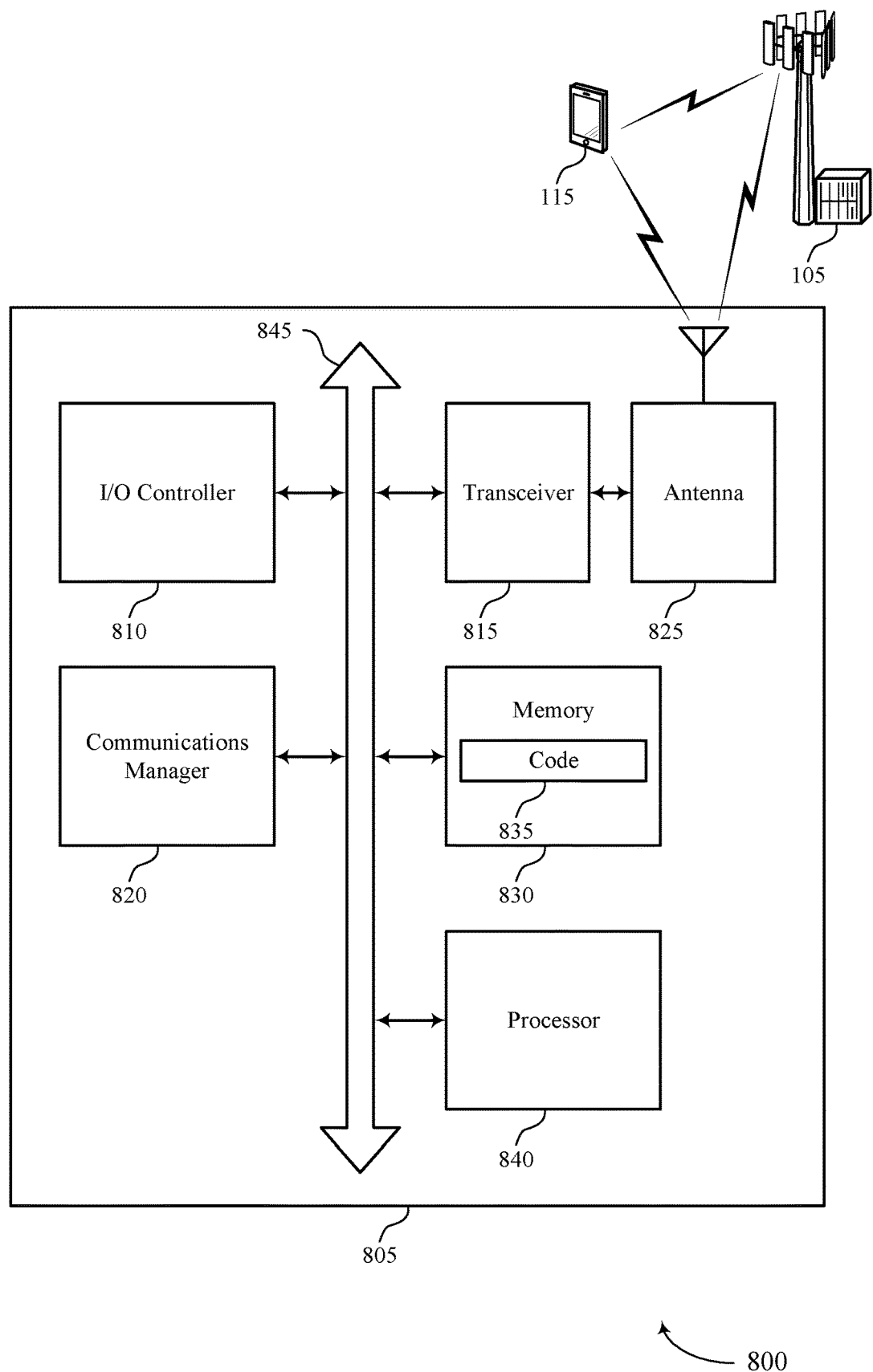
FIG. 8 shows a diagram of a system including a device that supports resource restrictions for SBFD and dynamic TDD operation in accordance with one or more aspects of the present disclosure.

FIG. 8 shows a diagram of a system 800 including a device 805 that supports resource restrictions for SBFD and dynamic TDD operation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting resource restrictions for SBFD and dynamic TDD operation). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands. The communications manager 820 may be configured as or otherwise support a means for communicating with the network entity via at least a subset of the one or more sub-bands of the one or more slots in accordance with the restriction.

By including or configuring the communications manager 820 in accordance with examples as described herein, the device 805 may support techniques for CLI mitigation via resource restrictions for SBFD and dynamic TDD operation which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of resource restrictions for SBFD and dynamic TDD operation as described herein, or the processor 840 and the memory 830 may be otherwise configured to perform or support such operations.

Figure 9:
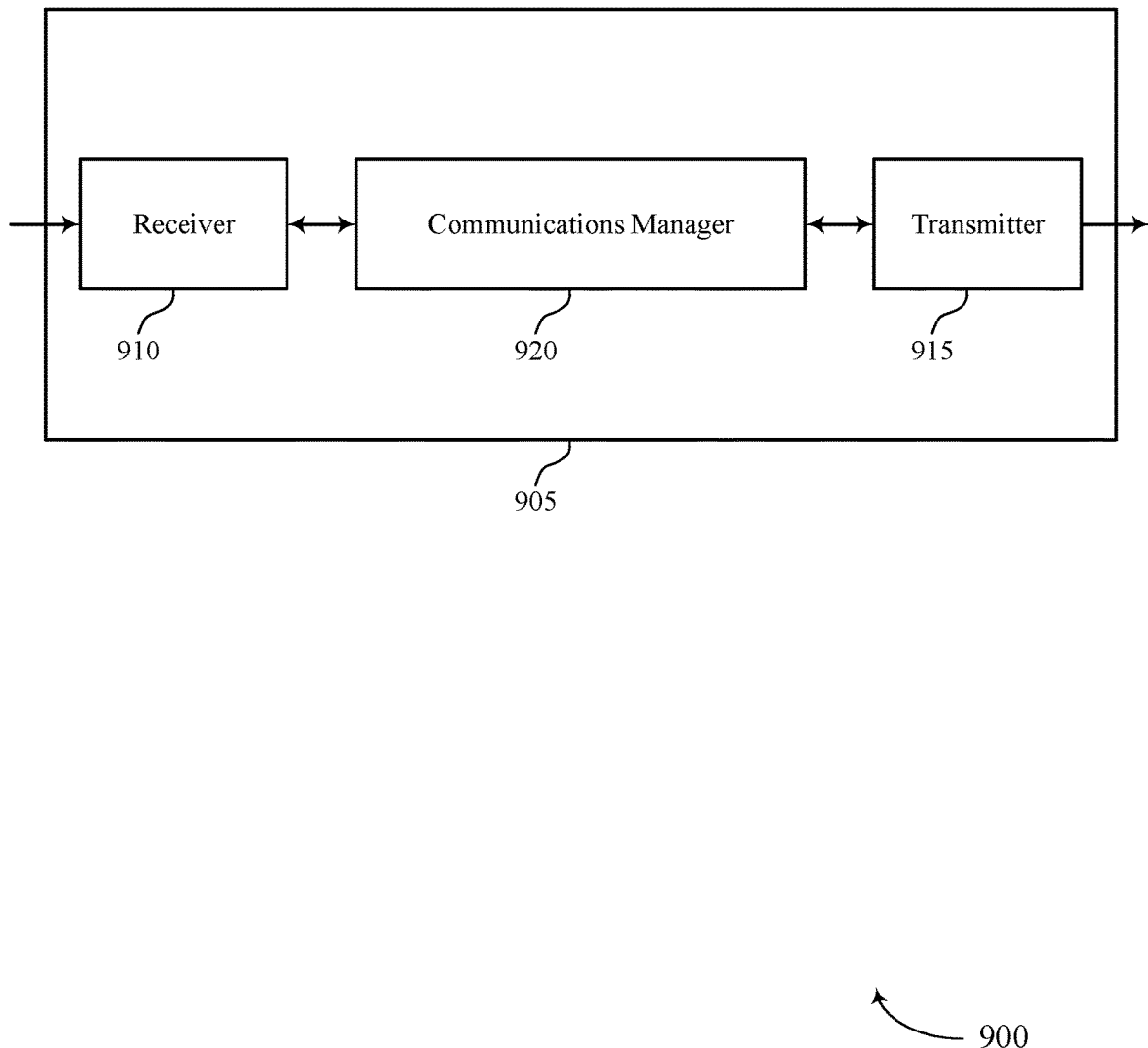
FIGS. 9 and 10 show block diagrams of devices that support resource restrictions for SBFD and dynamic TDD operation in accordance with one or more aspects of the present disclosure.

FIG. 9 shows a block diagram 900 of a device 905 that supports resource restrictions for SBFD and dynamic TDD operation in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of resource restrictions for SBFD and dynamic TDD operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands. The communications manager 920 may be configured as or otherwise support a means for communicating with the UE via at least a subset of the one or more sub-bands of the one or more slots in accordance with the restriction.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for CLI mitigation via resource restrictions for SBFD and dynamic TDD operation which may result in reduced processing, reduced power consumption, and more efficient utilization of communication resources, among other advantages.

Figure 10:
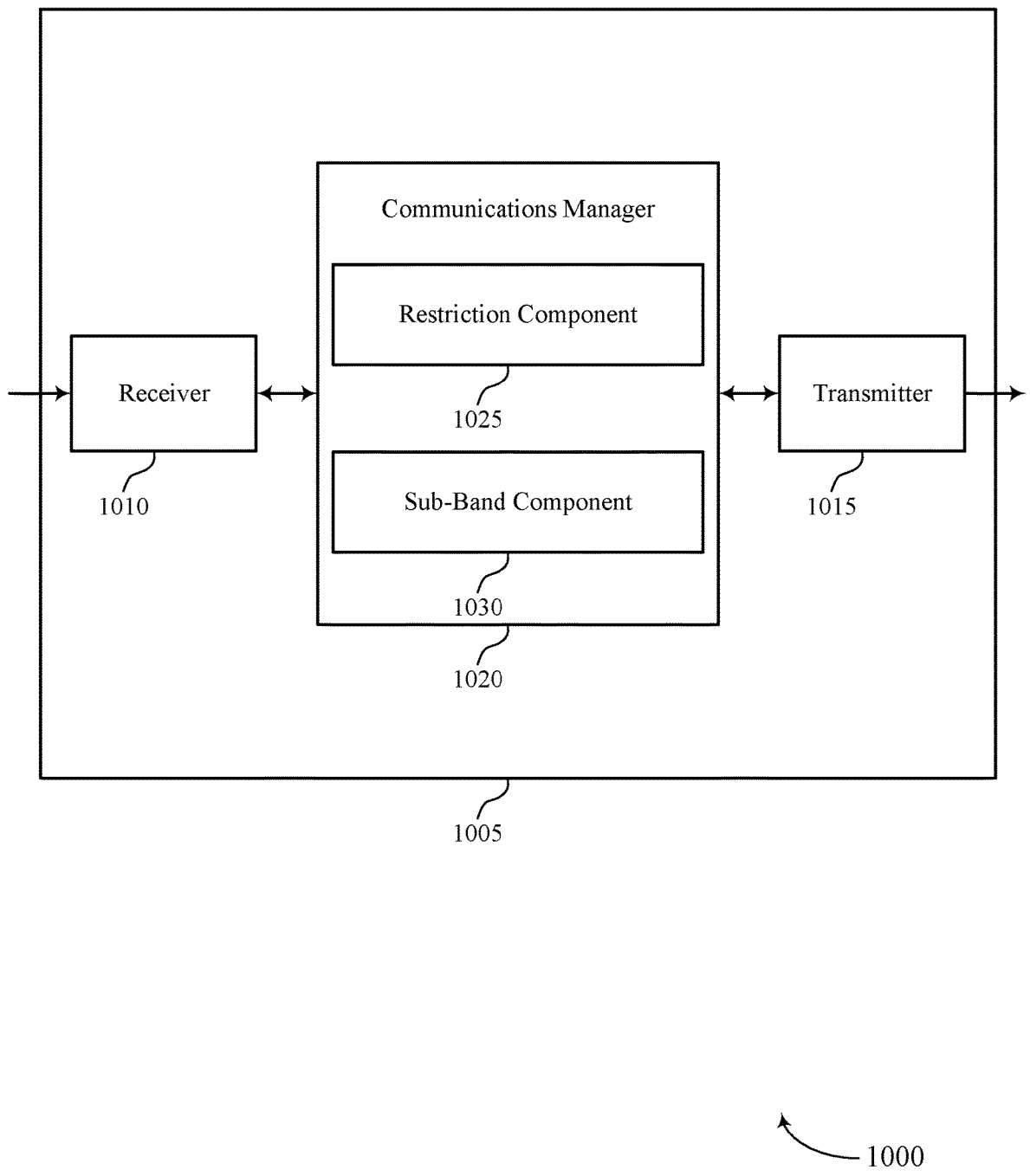

FIG. 10 shows a block diagram 1000 of a device 1005 that supports resource restrictions for SBFD and dynamic TDD operation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of resource restrictions for SBFD and dynamic TDD operation as described herein. For example, the communications manager 1020 may include a restriction component 1025 a sub-band component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The restriction component 1025 may be configured as or otherwise support a means for transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands. The sub-band component 1030 may be configured as or otherwise support a means for communicating with the UE via at least a subset of the one or more sub-bands of the one or more slots in accordance with the restriction.

Figure 11:
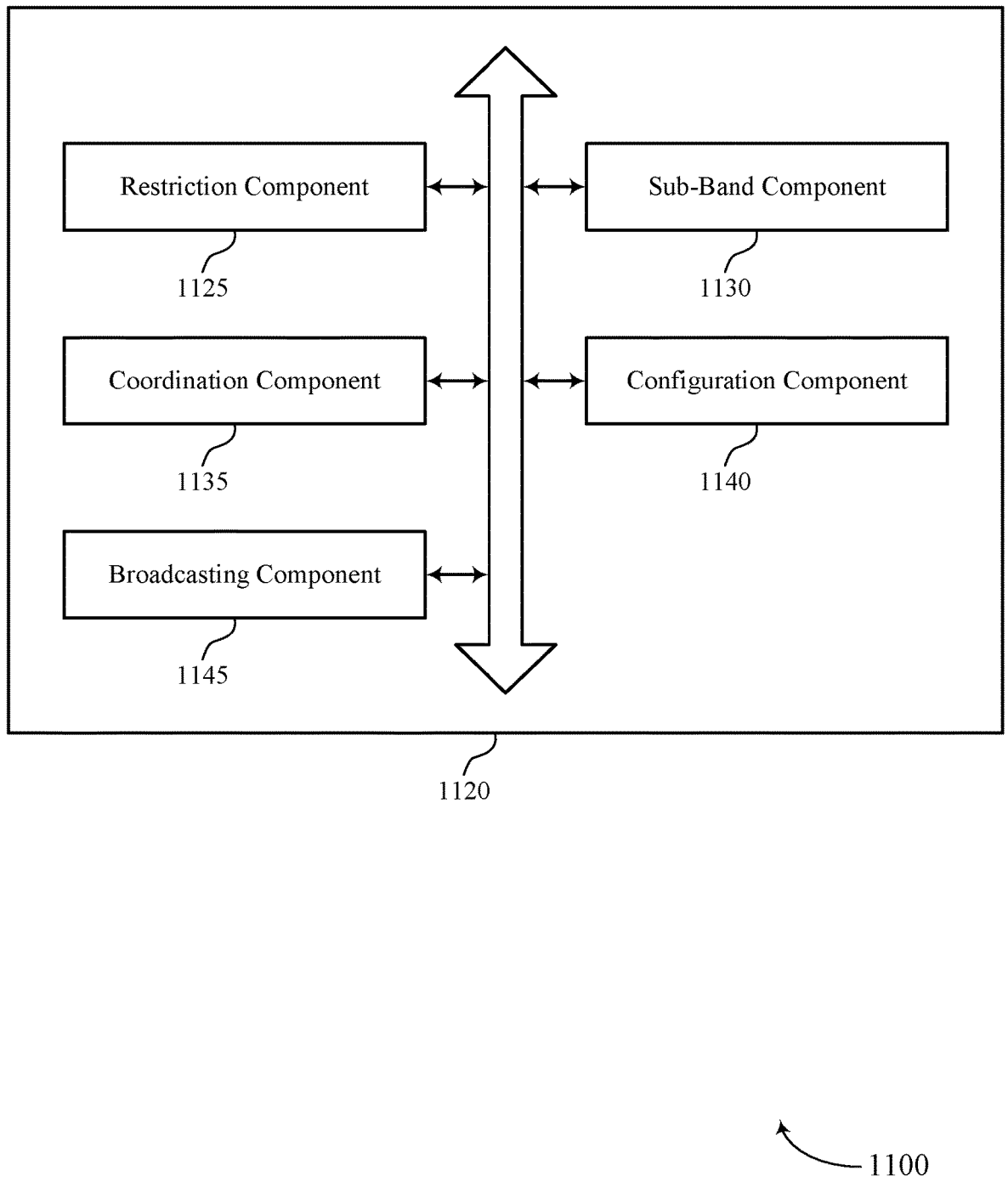
FIG. 11 shows a block diagram of a communications manager that supports resource restrictions for SBFD and dynamic TDD operation in accordance with one or more aspects of the present disclosure.

FIG. 11 shows a block diagram 1100 of a communications manager 1120 that supports resource restrictions for SBFD and dynamic TDD operation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of resource restrictions for SBFD and dynamic TDD operation as described herein. For example, the communications manager 1120 may include a restriction component 1125, a sub-band component 1130, a coordination component 1135, a configuration component 1140, a broadcasting component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The restriction component 1125 may be configured as or otherwise support a means for transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands. The sub-band component 1130 may be configured as or otherwise support a means for communicating with the UE via at least a subset of the one or more sub-bands of the one or more slots in accordance with the restriction.

In some examples, the coordination component 1135 may be configured as or otherwise support a means for receiving coordination information indicating the one or more slots associated with communications of the UE, where the restriction to the one or more slots associated with communications of the UE is based on the coordination information.

In some examples, to support transmitting the control signaling, the restriction component 1125 may be configured as or otherwise support a means for transmitting an indication that the restriction applies to a first slot of the one or more slots, where modifying the duplexing setting includes restricting the UE from communicating via one or more uplink sub-bands during the slot or restricting the UE from communicating via one or more downlink sub-bands during the slot.

In some examples, to support transmitting the control signaling indicating the restriction, the configuration component 1140 may be configured as or otherwise support a means for transmitting an indication of respective sub-band configurations associated with each of the one or more slots, where modifying the availability of the at least portion of the one or more sub-bands is based on the respective sub-band configurations.

In some examples, to support communicating with the network entity, the restriction component 1125 may be configured as or otherwise support a means for transmitting or receiving one or more transmissions based on the one or more transmissions being associated with a set of frequency resources within the subset of available frequency resources.

In some examples, the configuration component 1140 may be configured as or otherwise support a means for transmitting second control signaling indicating a set of multiple slot restriction configurations to the one or more slots associated with communications with the UE, where the control signaling indicating the restriction to the one or more slots includes an indication of a first slot restriction configuration of the set of multiple slot restriction configurations.

In some examples, to support transmitting the control signaling indicating the restriction, the broadcasting component 1145 may be configured as or otherwise support a means for transmitting a broadcast communication indicating one or more restricted time resources, one or more restricted frequency resources, or both, associated with the one or more slots, where communicating with the UE is based on the one or more restricted time resources, the one or more restricted frequency resources, or both.

In some examples, to support transmitting the control signaling indicating the restriction, the restriction component 1125 may be configured as or otherwise support a means for transmitting an indication of one or more sub-fields of the field indicating the restriction, where each sub-field is associated with a respective slot of the one or more slots, and where each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

In some examples, to support communicating with the UE via the at least subset of the one or more sub-bands of the one or more slots in accordance with the restriction, the sub-band component 1130 may be configured as or otherwise support a means for receiving uplink signaling via at least a subset of the one or more slots according to the one or more parameters associated with the transmit power, the transmit beam, or both.

In some examples, the control signaling includes respective restrictions associated with a set of multiple UEs.

In some examples, to support transmitting the control signaling indicating the restriction, the restriction component 1125 may be configured as or otherwise support a means for transmitting an indication of a pattern of one or more uplink resource restrictions to the one or more slots, one or more downlink resource restriction to the one or more slots, or both, where the restriction is based on the pattern, and where the control signaling includes a field indicating the pattern.

Figure 12:
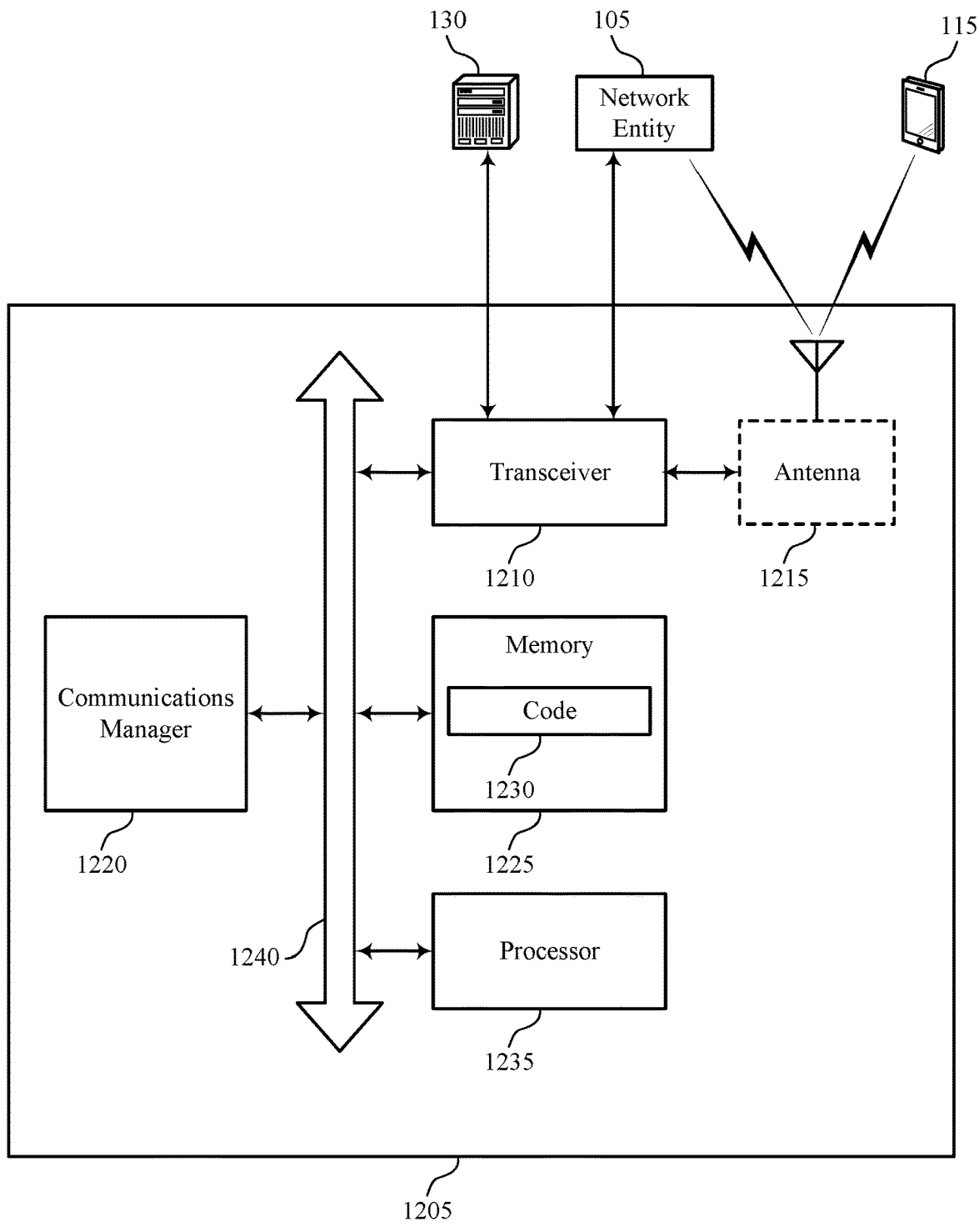
FIG. 12 shows a diagram of a system including a device that supports resource restrictions for SBFD and dynamic TDD operation in accordance with one or more aspects of the present disclosure.

FIG. 12 shows a diagram of a system 1200 including a device 1205 that supports resource restrictions for SBFD and dynamic TDD operation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting resource restrictions for SBFD and dynamic TDD operation). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands. The communications manager 1220 may be configured as or otherwise support a means for communicating with the UE via at least a subset of the one or more sub-bands of the one or more slots in accordance with the restriction.

By including or configuring the communications manager 1220 in accordance with examples as described herein, the device 1205 may support techniques for CLI mitigation via resource restrictions for SBFD and dynamic TDD operation which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of resource restrictions for SBFD and dynamic TDD operation as described herein, or the processor 1235 and the memory 1225 may be otherwise configured to perform or support such operations.

Figure 13:
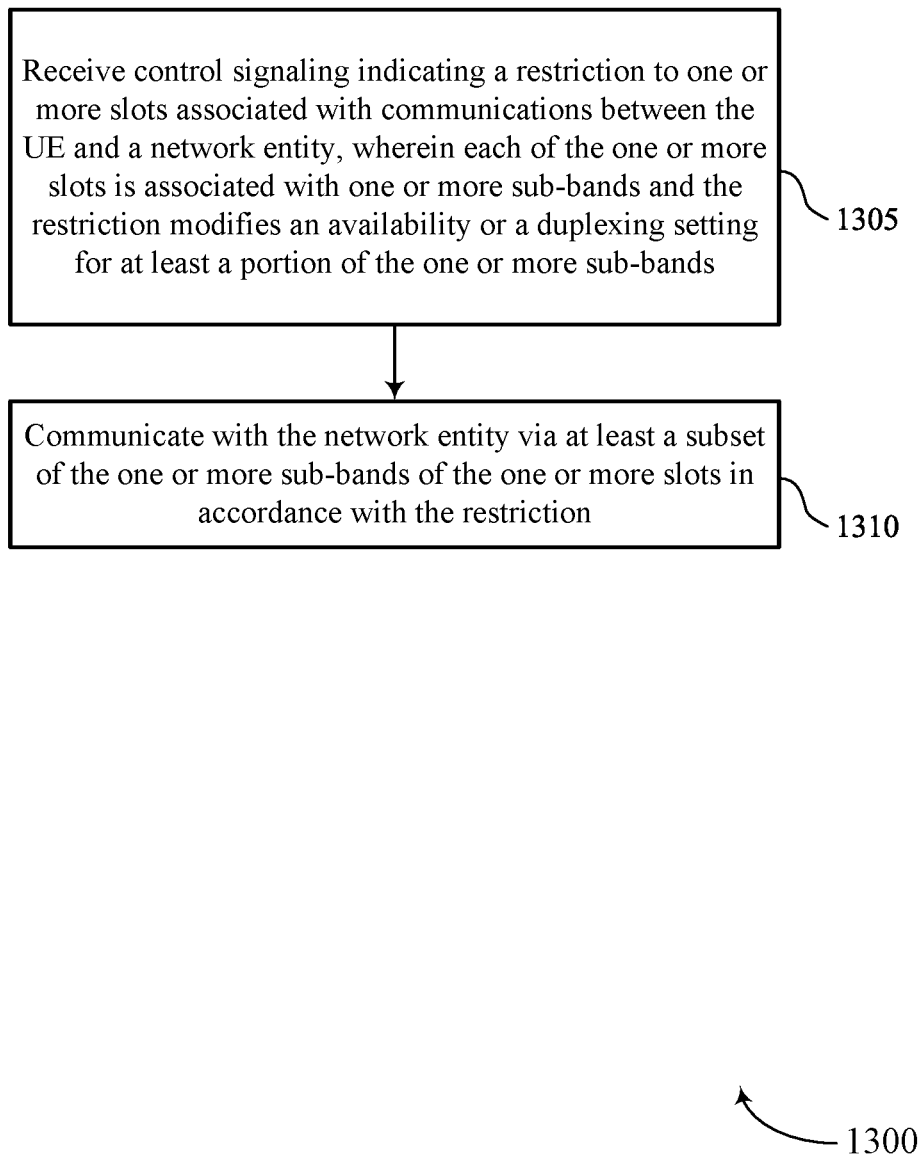
FIGS. 13 through 15 show flowcharts illustrating methods that support resource restrictions for SBFD and dynamic TDD operation in accordance with one or more aspects of the present disclosure.

FIG. 13 shows a flowchart illustrating a method 1300 that supports resource restrictions for SBFD and dynamic TDD operation in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a restriction to one or more slots associated with communications between the UE and a network entity, where each of the one or more slots is associated with one or more sub-bands and the restriction modifies an availability or a duplexing setting for at least a portion of the one or more sub-bands. The operations of 1305 may be performed in accordance with examples as disclosed herein. In some examples, aspects of the operations of 1305 may be performed by a restriction component 725 as described with reference to FIG. 7.

At 1310, the method may include communicating with the network entity via at least a subset of the one or more sub-bands of the one or more slots in accordance with the restriction. The operations of 1310 may be performed in accordance with examples as disclosed herein. In some examples, aspects of the operations of 1310 may be performed by a sub-band component 730 as described with reference to FIG. 7.

Figure 14:
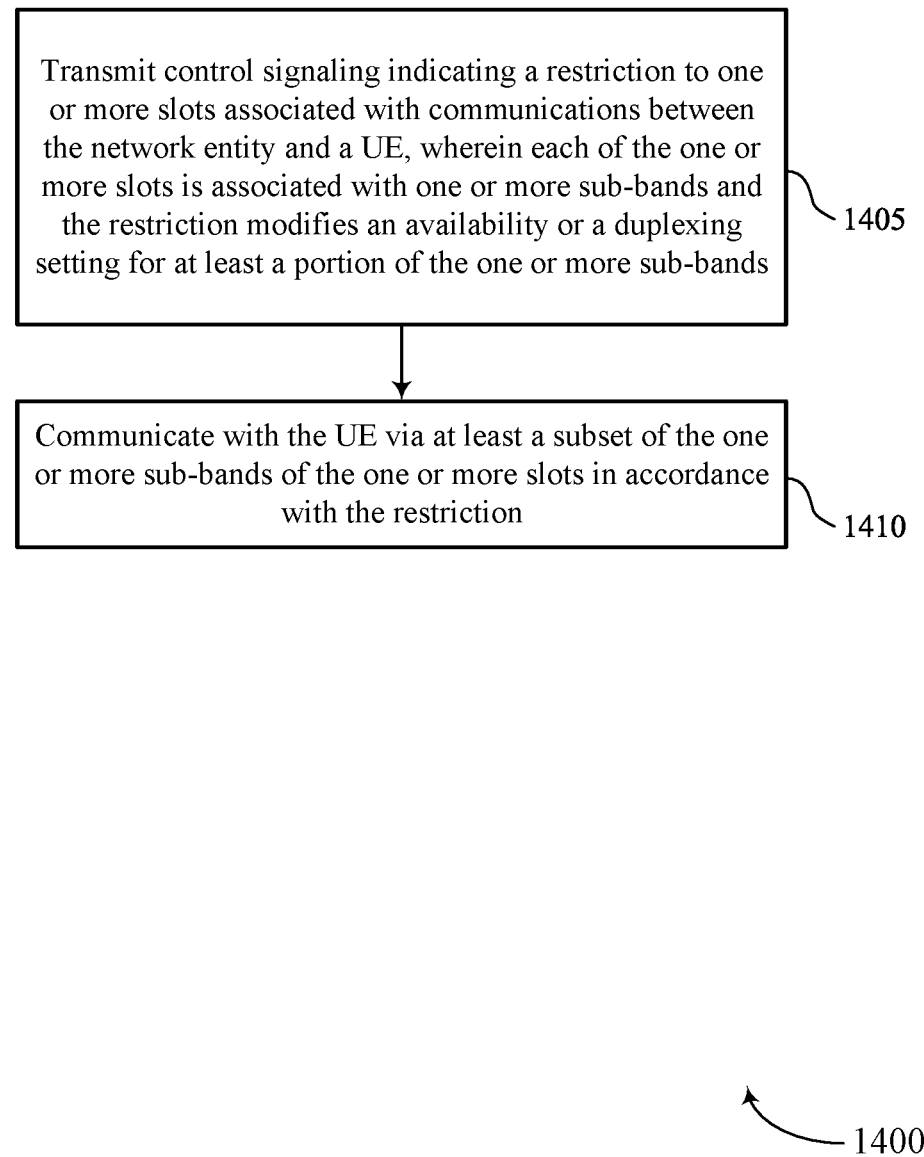

FIG. 14 shows a flowchart illustrating a method 1400 that supports resource restrictions for SBFD and dynamic TDD operation in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands. The operations of 1405 may be performed in accordance with examples as disclosed herein. In some examples, aspects of the operations of 1405 may be performed by a restriction component 1125 as described with reference to FIG. 11.

At 1410, the method may include communicating with the UE via at least a subset of the one or more sub-bands of the one or more slots in accordance with the restriction. The operations of 1410 may be performed in accordance with examples as disclosed herein. In some examples, aspects of the operations of 1410 may be performed by a sub-band component 1130 as described with reference to FIG. 11.

Figure 15:
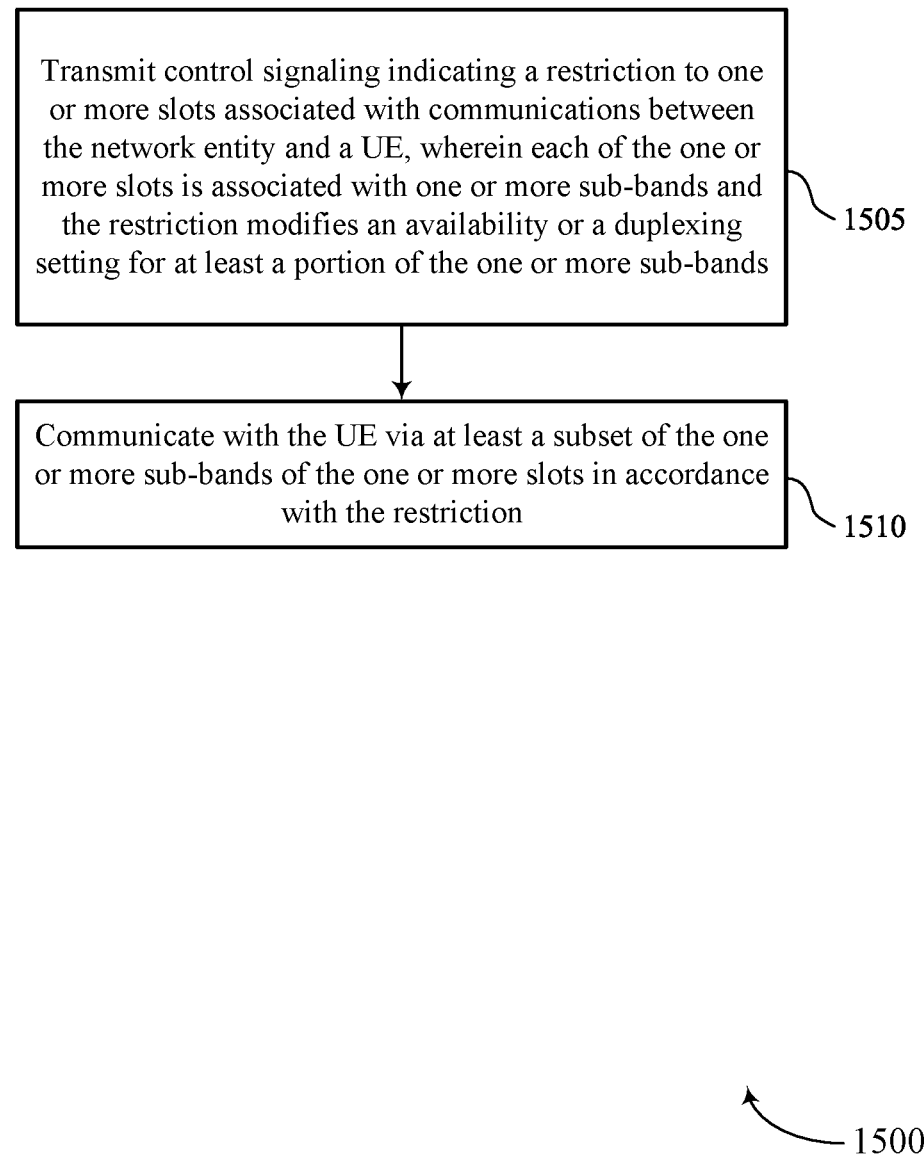

FIG. 15 shows a flowchart illustrating a method 1500 that supports resource restrictions for SBFD and dynamic TDD operation in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling indicating a restriction to one or more slots associated with communications between the network entity and a UE, where each of the one or more slots is associated with one or more sub-bands and the restriction modifies an availability or a duplexing setting for at least a portion of the one or more sub-bands. The operations of 1505 may be performed in accordance with examples as disclosed herein. In some examples, aspects of the operations of 1505 may be performed by a restriction component 1125 as described with reference to FIG. 11.

At 1510, the method may include communicating with the UE via at least a subset of the one or more sub-bands of the one or more slots in accordance with the restriction. The operations of 1510 may be performed in accordance with examples as disclosed herein. In some examples, aspects of the operations of 1510 may be performed by a sub-band component 1130 as described with reference to FIG. 11.

The following provides an overview of aspects of the present disclosure:

Aspect 1: A method for wireless communications at a UE, comprising: receiving control signaling indicating a restriction to one or more slots associated with communications between the UE and a network entity, wherein each of the one or more slots is associated with one or more sub-bands and the restriction modifies an availability or a duplexing setting for at least a portion of the one or more sub-bands; and communicating with the network entity via at least a subset of the one or more sub-bands of the one or more slots in accordance with the restriction.

Aspect 2: The method of aspect 1, wherein receiving the control signaling comprises: receiving an indication that the restriction applies to a first slot of the one or more slots, wherein modifying the duplexing setting comprises restricting the UE from communicating via one or more uplink sub-bands during the first slot or restricting the UE from communicating via one or more downlink sub-bands during the first slot.

Aspect 3: The method of aspect 2, wherein communicating with the network entity via the at least subset of the one or more sub-bands of the one or more slots in accordance with the restriction comprises: canceling a reception of downlink signaling via the one or more downlink sub-bands based at least in part on an overlap between a first set of resources associated with the downlink signaling and a second set of resources associated with the one or more downlink sub-bands.

Aspect 4: The method of aspect 3, wherein the downlink signaling is associated with periodic signaling or semi-periodic signaling.

Aspect 5: The method of any of aspects 2 through 4, wherein communicating with the network entity via the at least subset of the one or more sub-bands of the one or more slots in accordance with the restriction comprises: canceling a transmission of uplink signaling via the one or more uplink sub-bands based at least in part on an overlap between a first set of resources associated with the uplink signaling and a second set of resources associated with the one or more uplink sub-bands.

Aspect 6: The method of aspect 5, wherein the uplink signaling is associated with periodic signaling or semi-periodic signaling.

Aspect 7: The method of any of aspects 2 through 6, wherein modifying the duplexing setting comprises restricting communications via the one or more downlink sub-bands, and wherein communicating with the network entity via the at least subset of the one or more sub-bands of the one or more slots in accordance with the restriction comprises: receiving downlink signaling via the one or more downlink sub-bands in accordance with one or more rules associated with the restriction, wherein the downlink signaling is associated with a first set of resources that partially overlaps with a second set of resources associated with the one or more downlink sub-bands.

Aspect 8: The method of aspect 7, wherein the one or more rules comprises a first rule permitting the UE to receive periodic downlink signals, semi-periodic downlink signals, or both, via the one or more restricted downlink sub-bands, a second rule permitting the UE to receive signaling associated with a defined set of signal types via the one or more restricted downlink sub-bands, or a combination thereof.

Aspect 9: The method of any of aspects 2 through 8, wherein modifying the duplexing setting comprises communications via the one or more uplink sub-bands, wherein communicating with the network entity via the at least subset of the one or more sub-bands of the one or more slots in accordance with the restriction comprises: transmitting uplink signaling via the one or more uplink sub-bands in accordance with one or more rules associated with the restriction, and wherein the uplink signaling is associated with a first set of resources that partially overlaps with a second set of resources associated with the one or more uplink sub-bands.

Aspect 10: The method of aspect 9, wherein the one or more rules comprises a first rule permitting the UE to transmit periodic uplink signals, semi-periodic uplink signals, or both, via the one or more uplink restricted sub-bands, a fourth rule permitting the UE to transmit signaling associated with a defined set of signal types via the one or more uplink restricted sub-bands, or a combination thereof.

Aspect 11: The method of any of aspects 1 through 10, wherein receiving the control signaling indicating the restriction comprises: receiving an indication of respective sub-band configurations associated with each of the one or more slots, wherein modifying the availability of the at least portion of the one or more sub-bands is based at least in part on the respective sub-band configurations.

Aspect 12: The method of aspect 11, wherein each sub-band configuration indicates a subset of available frequency resources from a set of frequency resources associated with a respective slot of the one or more slots, and wherein communicating with the network entity comprises: transmitting, to the network entity, or receiving, from the network entity, one or more transmissions based at least in part on the one or more transmissions being associated with a set of frequency resources within the subset of available frequency resources.

Aspect 13: The method of any of aspects 11 through 12, wherein each sub-band configuration indicates a subset of available frequency resources from a set of frequency resources associated with a respective slot of the one or more slots, and wherein communicating with the network entity comprises: cancelling a transmission or reception of one or more transmissions associated with a set of frequency resources that falls at least partially outside of the subset of available frequency resources.

Aspect 14: The method of any of aspects 1 through 13, further comprising: receiving a second control signaling indicating a plurality of slot restriction configurations to the one or more slots associated with communications between the UE and the network entity, wherein the control signaling indicating the restriction to the one or more slots comprises an indication of a first slot restriction configuration of the plurality of slot restriction configurations.

Aspect 15: The method of any of aspects 1 through 14, wherein receiving the control signaling indicating the restriction comprises: receiving a broadcast communication indicating one or more restricted time resources, one or more restricted frequency resources, or both, associated with the one or more slots, wherein communicating with the network entity is based at least in part on the one or more restricted time resources, the one or more restricted frequency resources, or both.

Aspect 16: The method of any of aspects 1 through 15, wherein the control signaling comprises a field indicating the restriction, and wherein receiving the control signaling indicating the restriction comprises: receiving a bitmap via the field indicating the restriction, wherein each bit in the bitmap is associated with a respective slot of the one or more slots, and wherein each bit in the bitmap indicates an uplink restriction to the respective slot of the one or more slots or a downlink restriction to the respective slot of the one or more slots.

Aspect 17: The method of any of aspects 1 through 15, wherein the control signaling comprises a field indicating the restriction, and wherein receiving the control signaling indicating the restriction comprises: receiving an indication of one or more sub-fields of the field indicating the restriction, wherein each sub-field is associated with a respective slot of the one or more slots, and wherein each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

Aspect 18: The method of aspect 17, wherein communicating with the network entity via the at least subset of the one or more sub-bands of the one or more slots in accordance with the restriction comprises: transmitting uplink signaling via at least a subset of the one or more slots according to the one or more parameters associated with the transmit power, the one or more parameters associated with the transmit beam, or both.

Aspect 19: The method of any of aspects 1 through 15, wherein the control signaling comprises respective restrictions associated with a plurality of UEs, and the UE determines the restriction to the one or more slots associated with communications between the UE and the network entity based at least in part on a position of the indication of the restriction within the control signaling.

Aspect 20: The method of any of aspects 1 through 15, wherein receiving the control signaling indicating the restriction comprises: receiving an indication of a pattern of one or more uplink resource restrictions to the one or more slots, one or more downlink resource restriction to the one or more slots, or both, wherein the restriction is based at least in part on the pattern, and wherein the control signaling comprises a field indicating the pattern.

Aspect 21: The method of any of aspects 1 through 20, wherein modifying the availability or the duplexing setting for the at least portion of the one or more sub-bands is based at least in part on a time threshold, the time threshold is associated with a first quantity of slots that is greater than or equal to a second quantity of slots associated with a monitoring periodicity for the control signaling or the time threshold is associated with a third quantity of slots following a first slot of the one or more slots comprising feedback information associated with the control signaling, the third quantity of slots is based at least in part on a fourth quantity of slots in a subframe associated with communications between the UE and the network entity.

Aspect 22: A method for wireless communications at a network entity, comprising: transmitting control signaling indicating a restriction to one or more slots associated with communications between the network entity and a UE, wherein each of the one or more slots is associated with one or more sub-bands and the restriction modifies an availability or a duplexing setting for at least a portion of the one or more sub-bands; and communicating with the UE via at least a subset of the one or more sub-bands of the one or more slots in accordance with the restriction.

Aspect 23: The method of aspect 22, further comprising: receiving coordination information indicating the one or more slots associated with communications of the UE, wherein the restriction to the one or more slots associated with communications of the UE is based at least in part on the coordination information.

Aspect 24: The method of any of aspects 22 through 23, wherein transmitting the control signaling comprises: transmitting an indication that the restriction applies to a first slot of the one or more slots, wherein modifying the duplexing setting comprises restricting the UE from communicating via one or more uplink sub-bands during the slot or restricting the UE from communicating via one or more downlink sub-bands during the slot.

Aspect 25: The method of any of aspects 22 through 24, wherein transmitting the control signaling indicating the restriction comprises: transmitting an indication of respective sub-band configurations associated with each of the one or more slots, wherein modifying the availability of the at least portion of the one or more sub-bands is based at least in part on the respective sub-band configurations.

Aspect 26: The method of aspect 25, wherein each sub-band configuration indicates a subset of available frequency resources from a set of frequency resources associated with a respective slot of the one or more slots, and wherein communicating with the network entity comprises: transmitting or receiving one or more transmissions based at least in part on the one or more transmissions being associated with a set of frequency resources within the subset of available frequency resources.

Aspect 27: The method of any of aspects 22 through 26, further comprising: transmitting second control signaling indicating a plurality of slot restriction configurations to the one or more slots associated with communications with the UE, wherein the control signaling indicating the restriction to the one or more slots comprises an indication of a first slot restriction configuration of the plurality of slot restriction configurations.

Aspect 28: The method of any of aspects 22 through 27, wherein transmitting the control signaling indicating the restriction comprises: transmitting a broadcast communication indicating one or more restricted time resources, one or more restricted frequency resources, or both, associated with the one or more slots, wherein communicating with the UE is based at least in part on the one or more restricted time resources, the one or more restricted frequency resources, or both.

Aspect 29: The method of any of aspects 22 through 28, wherein the control signaling comprises a field indicating the restriction, and wherein transmitting the control signaling indicating the restriction comprises: transmitting an indication of one or more sub-fields of the field indicating the restriction, wherein each sub-field is associated with a respective slot of the one or more slots, and wherein each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

Aspect 30: The method of aspect 29, wherein communicating with the UE via the at least subset of the one or more sub-bands of the one or more slots in accordance with the restriction comprises: receiving uplink signaling via at least a subset of the one or more slots according to the one or more parameters associated with the transmit power, the transmit beam, or both.

Aspect 31: The method of any of aspects 22 through 29, wherein the control signaling comprises respective restrictions associated with a plurality of UEs.

Aspect 32: The method of any of aspects 22 through 29, wherein transmitting the control signaling indicating the restriction comprises: transmitting an indication of a pattern of one or more uplink resource restrictions to the one or more slots, one or more downlink resource restriction to the one or more slots, or both, wherein the restriction is based at least in part on the pattern, and wherein the control signaling comprises a field indicating the pattern.

Aspect 33: An apparatus for wireless communications at a UE, comprising a processor; memory coupled with the processor; and instructions stored in the memory and executable by the processor to cause the apparatus to perform a method of any of aspects 1 through 21.

Aspect 34: An apparatus for wireless communications at a UE, comprising at least one means for performing a method of any of aspects 1 through 21.

Aspect 35: A non-transitory computer-readable medium storing code for wireless communications at a UE, the code comprising instructions executable by a processor to perform a method of any of aspects 1 through 21.

Aspect 36: An apparatus for wireless communications at a network entity, comprising a processor; memory coupled with the processor; and instructions stored in the memory and executable by the processor to cause the apparatus to perform a method of any of aspects 22 through 32.

Aspect 37: An apparatus for wireless communications at a network entity, comprising at least one means for performing a method of any of aspects 22 through 32.

Aspect 38: A non-transitory computer-readable medium storing code for wireless communications at a network entity, the code comprising instructions executable by a processor to perform a method of any of aspects 22 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor;
   at least one memory coupled with the at least one processor; and
   instructions stored in the at least one memory and executable by the at least one processor to cause the apparatus to:
      receive signaling that indicates a slot format to be applied to one or more slots associated with communications between the UE and a network entity, wherein the slot format indicates first time domain resources allocated for uplink communications, indicates second time domain resources allocated for downlink communications, and indicates third time domain resources allocated for both the uplink communications and the downlink communications, and wherein each of the one or more slots is associated with one or more sub-bands in accordance with the slot format;

receive, after reception of the signaling, control signaling indicating a restriction to the one or more slots, wherein the restriction modifies an availability or a duplexing setting for at least a portion of the one or more sub-bands; and communicate with the network entity via at least a subset of the one or more sub-bands of the one or more slots in accordance with the restriction.

2. The apparatus of claim 1, wherein the instructions to receive the control signaling are executable by the at least one processor to cause the apparatus to:

receive an indication that the restriction applies to a first slot of the one or more slots, wherein modifying the duplexing setting comprises restricting the UE from communicating via one or more uplink sub-bands during the first slot or restricting the UE from communicating via one or more downlink sub-bands during the first slot.

3. The apparatus of claim 2, wherein the instructions to communicate with the network entity via the at least subset of the one or more sub-bands of the one or more slots in accordance with the restriction are executable by the at least one processor to cause the apparatus to:

cancel a reception of downlink signaling via the one or more downlink sub-bands based at least in part on an overlap between a first set of resources associated with the downlink signaling and a second set of resources associated with the one or more downlink sub-bands.

4. The apparatus of claim 3, wherein the downlink signaling is associated with periodic signaling or semi-periodic signaling.

5. The apparatus of claim 2, wherein the instructions to communicate with the network entity via the at least subset of the one or more sub-bands of the one or more slots in accordance with the restriction are executable by the at least one processor to cause the apparatus to:

cancel a transmission of uplink signaling via the one or more uplink sub-bands based at least in part on an overlap between a first set of resources associated with the uplink signaling and a second set of resources associated with the one or more uplink sub-bands.

6. The apparatus of claim 5, wherein the uplink signaling is associated with periodic signaling or semi-periodic signaling.

7. The apparatus of claim 2, wherein the instructions to modify the duplexing setting comprises instructions to restrict communications via the one or more downlink sub-bands, and wherein the instructions to communicate with the network entity via the at least subset of the one or more sub-bands of the one or more slots in accordance with the restriction are executable by the at least one processor to cause the apparatus to:

receive downlink signaling via the one or more downlink sub-bands in accordance with one or more rules associated with the restriction, wherein the downlink signaling is associated with a first set of resources that partially overlaps with a second set of resources associated with the one or more downlink sub-bands.

8. The apparatus of claim 7, wherein the one or more rules comprises a first rule permitting the UE to receive periodic downlink signals, semi-periodic downlink signals, or both, via the one or more restricted downlink sub-bands, a second rule permitting the UE to receive signaling associated with a defined set of signal types via the one or more restricted downlink sub-bands, or a combination thereof.

9. The apparatus of claim 2, wherein the instructions to modify the duplexing setting comprises instructions to restrict communications via the one or more uplink sub-bands, and wherein the instructions to communicate with the network entity via the at least subset of the one or more sub-bands of the one or more slots in accordance with the restriction are executable by the at least one processor to cause the apparatus to:

transmit uplink signaling via the one or more uplink sub-bands in accordance with one or more rules associated with the restriction, wherein the uplink signaling is associated with a first set of resources that partially overlaps with a second set of resources associated with the one or more uplink sub-bands.

10. The apparatus of claim 9, wherein the one or more rules comprises a first rule permitting the UE to transmit periodic uplink signals, semi-periodic uplink signals, or both, via the one or more uplink restricted sub-bands, a fourth rule permitting the UE to transmit signaling associated with a defined set of signal types via the one or more uplink restricted sub-bands, or a combination thereof.

11. The apparatus of claim 1, wherein the instructions to receive the control signaling indicating the restriction are executable by the at least one processor to cause the apparatus to:

receive an indication of respective sub-band configurations associated with each of the one or more slots, wherein modifying the availability of the at least portion of the one or more sub-bands is based at least in part on the respective sub-band configurations.

12. The apparatus of claim 11, wherein each sub-band configuration indicates a subset of available frequency resources from a set of frequency resources associated with a respective slot of the one or more slots, and wherein the instructions to communicate with the network entity are executable by the at least one processor to cause the apparatus to:

transmit, to the network entity, or receiving, from the network entity, one or more transmissions based at least in part on the one or more transmissions being associated with a set of frequency resources within the subset of available frequency resources.

13. The apparatus of claim 11, wherein each sub-band configuration indicates a subset of available frequency resources from a set of frequency resources associated with a respective slot of the one or more slots, and wherein the instructions to communicate with the network entity are executable by the at least one processor to cause the apparatus to:

cancel a transmission or reception of one or more transmissions associated with a set of frequency resources that falls at least partially outside of the subset of available frequency resources.

14. The apparatus of claim 1, wherein the instructions are further executable by the at least one processor to cause the apparatus to:

receive a second control signaling indicating a plurality of slot restriction configurations to the one or more slots associated with communications between the UE and the network entity, wherein the control signaling indicating the restriction to the one or more slots comprises an indication of a first slot restriction configuration of the plurality of slot restriction configurations.

15. The apparatus of claim 1, wherein the instructions to receive the control signaling indicating the restriction are executable by the at least one processor to cause the apparatus to:
receive a broadcast communication indicating one or more restricted time resources, one or more restricted frequency resources, or both, associated with the one or more slots, wherein communicating with the network entity is based at least in part on the one or more restricted time resources, the one or more restricted frequency resources, or both.

16. The apparatus of claim 1, wherein the control signaling comprises a field indicating the restriction, and wherein the instructions to receive the control signaling indicating the restriction are executable by the at least one processor to cause the apparatus to:
receive a bitmap via the field indicating the restriction, wherein each bit in the bitmap is associated with a respective slot of the one or more slots, and wherein each bit in the bitmap indicates an uplink restriction to the respective slot of the one or more slots or a downlink restriction to the respective slot of the one or more slots.

17. The apparatus of claim 1, wherein the control signaling comprises a field indicating the restriction, and wherein the instructions to receive the control signaling indicating the restriction are executable by the at least one processor to cause the apparatus to:
receive an indication of one or more sub-fields of the field indicating the restriction, wherein each sub-field is associated with a respective slot of the one or more slots, and wherein each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

18. The apparatus of claim 17, wherein the instructions to communicate with the network entity via the at least subset of the one or more sub-bands of the one or more slots in accordance with the restriction are executable by the at least one processor to cause the apparatus to:
transmit uplink signaling via at least a subset of the one or more slots according to the one or more parameters associated with the transmit power, the one or more parameters associated with the transmit beam, or both.

19. The apparatus of claim 1, wherein the control signaling comprises respective restrictions associated with a plurality of UEs, and wherein the UE determines the restriction to the one or more slots associated with communications between the UE and the network entity based at least in part on a position of the indication of the restriction within the control signaling.

20. The apparatus of claim 1, wherein the instructions to receive the control signaling indicating the restriction are executable by the at least one processor to cause the apparatus to:
receive an indication of a pattern of one or more uplink resource restrictions to the one or more slots, one or more downlink resource restriction to the one or more slots, or both, wherein the restriction is based at least in part on the pattern, and wherein the control signaling comprises a field indicating the pattern.

21. The apparatus of claim 1, wherein modifying the availability or the duplexing setting for the at least portion of the one or more sub-bands is based at least in part on a time threshold, and wherein the time threshold is associated with a first quantity of slots that is greater than or equal to a second quantity of slots associated with a monitoring periodicity for the control signaling or the time threshold is associated with a third quantity of slots following a first slot of the one or more slots comprising feedback information associated with the control signaling, and wherein the third quantity of slots is based at least in part on a fourth quantity of slots in a subframe associated with communications between the UE and the network entity.

22. An apparatus for wireless communications at a network entity, comprising:
at least one processor;
at least one memory coupled with the at least one processor; and
instructions stored in the at least one memory and executable by the at least one processor to cause the apparatus to:
transmit signaling that indicates a slot format to be applied to one or more slots associated with communications between a user equipment (UE) and the network entity, wherein the slot format indicates first time domain resources allocated for uplink communications, indicates second time domain resources allocated for downlink communications, and indicates third time domain resources allocated for both the uplink communications and the downlink communications, and wherein each of the one or more slots is associated with one or more sub-bands in accordance with the slot format;
transmit, after transmission of the signaling, control signaling indicating a restriction to the one or more slots, wherein the restriction modifies an availability or a duplexing setting for at least a portion of the one or more sub-bands; and
communicate with the UE via at least a subset of the one or more sub-bands of the one or more slots in accordance with the restriction.

23. The apparatus of claim 22, wherein the instructions are further executable by the at least one processor to cause the apparatus to:
receive coordination information indicating the one or more slots associated with communications of the UE, wherein the restriction to the one or more slots associated with communications of the UE is based at least in part on the coordination information.

24. The apparatus of claim 22, wherein the instructions to transmit the control signaling are executable by the at least one processor to cause the apparatus to:
transmit an indication that the restriction applies to a first slot of the one or more slots, wherein modifying the duplexing setting comprises restricting the UE from communicating via one or more uplink sub-bands during the slot or restricting the UE from communicating via one or more downlink sub-bands during the slot.

25. The apparatus of claim 22, wherein the instructions to transmit the control signaling indicating the restriction are executable by the at least one processor to cause the apparatus to:
transmit an indication of respective sub-band configurations associated with each of the one or more slots, wherein modifying the availability of the at least portion of the one or more sub-bands is based at least in part on the respective sub-band configurations.

26. The apparatus of claim 22, wherein the instructions are further executable by the at least one processor to cause the apparatus to:
- transmit second control signaling indicating a plurality of slot restriction configurations to the one or more slots associated with communications with the UE, wherein the control signaling indicating the restriction to the one or more slots comprises an indication of a first slot restriction configuration of the plurality of slot restriction configurations.

27. The apparatus of claim 22, wherein the instructions to transmit the control signaling indicating the restriction are executable by the at least one processor to cause the apparatus to:
- transmit a broadcast communication indicating one or more restricted time resources, one or more restricted frequency resources, or both, associated with the one or more slots, wherein communicating with the UE is based at least in part on the one or more restricted time resources, the one or more restricted frequency resources, or both.

28. The apparatus of claim 22, wherein the control signaling comprises a field indicating the restriction, and wherein the instructions to transmit the control signaling indicating the restriction are executable by the at least one processor to cause the apparatus to:
- transmit an indication of one or more sub-fields of the field indicating the restriction, wherein each sub-field is associated with a respective slot of the one or more slots, and wherein each sub-field indicates an uplink restriction to the respective slot, a downlink restriction to the respective slot, no restriction to the respective slot, one or more parameters associated with a transmit power further associated with the respective slot, one or more parameters associated with a transmit beam further associated with the respective slot, or any combination thereof.

29. A method for wireless communications at a user equipment (UE), comprising:
- receiving signaling that indicates a slot format to be applied to one or more slots associated with communications between the UE and a network entity, wherein the slot format indicates first time domain resources allocated for uplink communications, indicates second time domain resources allocated for downlink communications, and indicates third time domain resources allocated for both the uplink communications and the downlink communications, and wherein each of the one or more slots is associated with one or more sub-bands in accordance with the slot format;
- receiving, after reception of the signaling, control signaling indicating a restriction to the one or more slots, wherein the restriction modifies an availability or a duplexing setting for at least a portion of the one or more sub-bands; and
- communicating with the network entity via at least a subset of the one or more sub-bands of the one or more slots in accordance with the restriction.

30. A method for wireless communications at a network entity, comprising:
- transmitting signaling that indicates a slot format to be applied to one or more slots associated with communications between a user equipment (UE) and the network entity, wherein the slot format indicates first time domain resources allocated for uplink communications, indicates second time domain resources allocated for downlink communications, and indicates third time domain resources allocated for both the uplink communications and the downlink communications, and wherein each of the one or more slots is associated with one or more sub-bands in accordance with the slot format;
- transmitting, after transmission of the signaling, control signaling indicating a restriction to the one or more slots, wherein the restriction modifies an availability or a duplexing setting for at least a portion of the one or more sub-bands; and
- communicating with the UE via at least a subset of the one or more sub-bands of the one or more slots in accordance with the restriction.

* * * * *